US011140340B2

(12) United States Patent
Lajevardi et al.

(10) Patent No.: US 11,140,340 B2
(45) Date of Patent: Oct. 5, 2021

(54) SINGLE-CHIP RGB-D CAMERA

(71) Applicant: Robert Bosch GmbH, Stuttgart (DE)

(72) Inventors: Pedram Lajevardi, Menlo Park, CA (US); Christoph Lang, Sunnyvale, CA (US); Behnam Behroozpour, Foster City, CA (US); Ken Wojciechowski, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/958,198

(22) PCT Filed: Dec. 18, 2018

(86) PCT No.: PCT/EP2018/085578
§ 371 (c)(1),
(2) Date: Jun. 26, 2020

(87) PCT Pub. No.: WO2019/129544
PCT Pub. Date: Jul. 4, 2019

(65) Prior Publication Data
US 2021/0075980 A1 Mar. 11, 2021

Related U.S. Application Data

(60) Provisional application No. 62/610,325, filed on Dec. 26, 2017.

(51) Int. Cl.
*H04N 5/33* (2006.01)
*G01S 17/894* (2020.01)
(Continued)

(52) U.S. Cl.
CPC .......... *H04N 5/332* (2013.01); *G01S 7/4863* (2013.01); *G01S 7/4865* (2013.01); *G01S 17/894* (2020.01);
(Continued)

(58) Field of Classification Search
CPC .... H04N 5/332; H04N 5/36965; H04N 5/351; H04N 13/254; H04N 13/296;
(Continued)

(56) References Cited

U.S. PATENT DOCUMENTS 9,019,480 B2 4/2015 Tien et al.
2004/0233416 A1* 11/2004 Doemens .............. G01S 17/894
356/5.01
(Continued)

FOREIGN PATENT DOCUMENTS

GB     2 374 228 A    10/2002
WO     03/016944 A2    2/2003
WO     2013/104718 A2  7/2013

OTHER PUBLICATIONS

International Search Report corresponding to PCT Application No. PCT/EP2018/085578, dated Apr. 1, 2019 (4 pages).
(Continued)

*Primary Examiner* — Lin Ye
*Assistant Examiner* — Chan T Nguyen
(74) *Attorney, Agent, or Firm* — Maginot, Moore & Beck LLP

(57) ABSTRACT

A 3D camera uses a modulated visible light source for depth imaging and includes a processor operable to perform time multiplexing between image detection and depth or time-of-flight (ToF) detection using the same photodetectors. The camera can alternate between the image detection mode and the ToF detection mode to produce a continuous stream of color and depth images that can be overlaid without the need for any post-processing software. The camera is configured to determine time-of-flight using analog integration modules, thereby minimizing the circuitry necessary for analog-to-digital conversions and ToF calculations in the digital domain.

16 Claims, 16 Drawing Sheets

(51) Int. Cl.

| | |
|---|---|
| *H04N 13/254* | (2018.01) |
| *H04N 13/296* | (2018.01) |
| *G01S 7/4863* | (2020.01) |
| *G01S 7/4865* | (2020.01) |
| *H04N 5/369* | (2011.01) |
| *H04N 5/351* | (2011.01) |
| *H04N 5/3745* | (2011.01) |

(52) U.S. Cl.
CPC ......... *H04N 5/351* (2013.01); *H04N 5/36965* (2018.08); *H04N 13/254* (2018.05); *H04N 13/296* (2018.05); *H04N 5/37455* (2013.01)

(58) Field of Classification Search
CPC .............. H04N 5/37455; H04N 13/271; G01S 7/4863; G01S 7/4865; G01S 17/894; G01S 17/86; G01S 17/08–36
USPC .................................. 348/294; 356/5.01–5.08
See application file for complete search history.

(56) References Cited

U.S. PATENT DOCUMENTS

| | | |
|---|---|---|
| 2005/0285966 A1 | 12/2005 | Bamji et al. |
| 2015/0144790 A1 | 5/2015 | Velichko et al. |
| 2015/0373322 A1 | 12/2015 | Goma et al. |
| 2016/0181295 A1 | 6/2016 | Wan et al. |
| 2017/0272726 A1* | 9/2017 | Ovsiannikov .......... G01C 25/00 |
| 2018/0167562 A1* | 6/2018 | Suzuki ................... G01S 7/4863 |

OTHER PUBLICATIONS

Paudel, D. P. et al., "2D-3D Camera Fusion for Visual Odometry in Outdoor Environments," in IEEE/RSJ International Conference on Intelligent Robots and Systems (IROS 2014), Chicago, Sep. 2014 (7 pages).
Kim, W. et al., "A 1.5Mpixel RGBZ CMOS Image Sensor for Simultaneous Color and Range Image Capture," International Solid-Sate Circuits Conference, San Francisco, 2012 (3 pages).
Lange, R. et al., "Solid-State Time-of-Flight Range Camera," IEEE Journal of Quantum Electronics, pp. 390-397, Mar. 2001 (8 pages).
Shoji, K. et al., "A CMOS Time-of-Flight Range Image Sensor with Gates-on-Field-Oxide Structure," IEEE Sensors Journal, Dec. 1, 2007, vol. 7, No. 12, 1578-1586 (9 pages).
Behroozpour, B. et al., "Lidar System Architectures and Circuits," IEEE Communications Magazine, vol. 55, No. 10, Oct. 1, 2017, pp. 135-142 (8 pages).
Büttgen, B. et al., "CCD/CMOS Lock-In Pixel for Range Imaging: Challenges, Limitations and State-of-the-Art," 1st Range Imaging Research Day, 2005 (12 pages).
Stoppa, D. et al., "A 50x30-pixel CMOS Sensor for ToF-based Real Time 3D Imaging," IEEE Workshop CCD&AIS, pp. 230-233, 2005 (4 pages).
Durini, D. et al., "Experimental Comparison of Four Different CMOS Pixel Architectures Used in Indirect Time-of-Flight Distance Measurement Sensors," Image Sensors Workshop, 2011 (4 pages).
Davidovic, M. et al., "High Dynamic Range Background Light Suppression for a TOF Distance Measurement Sensor in 180nm CMOS," Sensors, 2011 IEEE (4 pages).
Davidovic, M. et al., "A 33x25 µm² Low-Power Range Finder," 2012 IEEE International Symposium on Circuits and Systems (ISCAS), pp. 922-925, 2012 (4 pages).
Bronzi, D. et al., "CMOS SPAD Pixels for Indirect Time-of-Flight Ranging," IEEE Photonics Conference 2012, pp. 22-23, 2012 (2 pages).
Texas Instruments,"OPT8241 3D Time-of-Flight Sensor," 2015 (34 pages).
PMD Technologies AG, "First commercially available 3D chip," pmd PhotonICs 19k-S3, 2020 (3 pages).
Melexis, "MLX75023 Time-of-Flight Sensory Array," Product Datasheet v1.18, Nov. 8, 2019 (28 pages).
Infineon Technologies AG, "Real3 Image Sensor IRS2381C 3D: Time-of-Flight single-chip," Product Brief, Feb. 2019 (2 pages).
Infineon Technologies AG, "Real3 image sensor family 3D depth sensing based on Time-of-Flight," Product Brief, Dec. 2015 (2 pages).
Le, N. N., "A Comparison of Intel RealSense Front-Facing Camera SR300 and F200," Intel, Feb. 24, 2016 (11 pages).
Kim, S.-J. et al., "A 640X480 Image Sensor with Unified Pixel Architecture for 2D/3D Imaging 0.11µm CMOS," 2011 Symposium on VLSI Circuits Digest of Technical Papers, pp. 92-93, Jun. 2011 (2 pages).
Simoni, A. et al., "Integrated Optical Sensors for 3-D Vision," Sensors, IEEE, pp. 1-4, Jun. 2002 (4 pages).
Stoppa, D. et al., "A 16x16-Pixel Range-Finding CMOS Image Sensor," Proceedings of the 30th European Solid-State Circuits Conference, pp. 419-422, Sep. 2004 (4 pages).
Stoppa, D. et al., "A Novel Fully Differential Pixel Concept for Indirect TOF 3D Measurement", Proceedings of the 20th IEEE Instrumentation Technology Conference, pp. 152-155, May 2003 (4 pages).
Viarani, L. et al., "A CMOS Smart Pixel for Active 3-D Vision Applications", IEEE Sensors Journal, vol. 4, Iss. 1, pp. 145-152, Feb. 2004 (8 pages).
Stoppa, D. et al., "Scannerless 3D Imaging Sensors," IEEE International Workshop on Imaging Systems and Techniques, pp. 58-61, May 2005 (4 pages).
Stoppa, D. et al., "A CMOS 3-D Imager Based on Single Photon Avalanche Diode," IEEE Transactions on Circuits and Systems I: Regular Papers, vol. 54, Iss. 1, pp. 4-12, Jan. 2007 (9 pages).
Bellisai, S. et al., "3D ranging with a high speed imaging array," 6th Conference on Ph.D. Research in Microelectronics & Electronics, IEEE, Jul. 2010 (4 pages).
Davidovic, M. et al., "TOF Range Finding Sensor in 90nm CMOS Capable of Suppressing 180 klx Ambient light," IEEE Sensors 2010 Conference, pp. 2413-2416, Nov. 2010 (4 pages).
Zach, G. et al., "A 16x16 Pixel Distance Sensor With In-Pixel Circuitry That Tolerates 150 klx of Ambient Light," IEEE Journal of Solid-State Circuits, vol. 45, No. 7, pp. 1345-1353, Jul. 2010 (9 pages).
Sgrott, O. et al., "A 134-Pixel CMOS Sensor for Combined Time-of-Flight and Optical Triangulation 3-D Imaging," IEEE Journal of Solid-State Circuits, vol. 45, No. 7, pp. 1354-1364, Jul. 2010 (11 pages).
Spickermann, A. et al., "CMOS 3D Image Sensor Based on Pulse Modulated Time-of-Flight Principle and Intrinsic Lateral Drift-Field Photodiode Pixels," 2011 Proceedings of the ESSCIRC (ESSCIRC), pp. 111-114, Sep. 2011 (4 pages).
Walker, R. J. et al., "A 128×96 Pixel Event-Driven Phase-Domain ΔΣBased Fully Digital 3D Camera in 0.13µm CMOS Imaging Technology ," 2011 IEEE International Solid-State Circuits Conference, Feb. 2011 (3 pages).
Hafiane, M. L. et al., "Depth Resolution Enhancement Technique for CMOS Time-of-Flight 3-D Image Sensors," IEEE Sensors Journal, vol. 12, Iss. 6, pp. 2320-2327, Jun. 2012 (8 pages).
Yasutomi, K. et al., "A 0.3mm-Resolution Time-of-Flight CMOS Range Imager with Column-Gating Clock-Skew Calibration," 2014 IEEE International Solid-State Circuits Conference Digest of Technical Papers, Feb. 2014 (3 pages).
Niclass, C. et al., "A 0.18- m CMOS SoC for a 100-m-Range 10-Frame/s 200 96-Pixel Time-of-Flight Depth Sensor," IEEE Journal of Solid-State Circuits, vol. 49, No. 1, pp. 315-330, Jan. 2014 (16 pages).
Tadmor, E. et al., "A Fast-Gated CMOS Image Sensor With a Vertical Overflow Drain Shutter Mechanism," IEEE Transactions on Electron Devices, vol. 63, No. 1, pp. 138-144, Jan. 2016 (7 pages).
Illade-Quinteiro, J. et al., "Time-of-Flight Chip in Standard CMOS Technology with In-Pixel Adaptive Number of Accumulations," 2016 IEEE International Symposium on Circuits and Systems (ISCAS), pp. 1910-1913, May 2016 (4 pages).

(56) References Cited

OTHER PUBLICATIONS

Villa, F. et al., "CMOS single photon sensor with in-pixel TDC for time-of-flight applications," 2013 IEEE Nordic-Mediterranean Workshop on Time-to-Digital Converters (NoMe TDC), Oct. 2013 (6 pages).
Payne, A. et al., "A 512×424 CMOS 3D Time-of-Flight Image Sensor with Multi-Frequency Photo-Demodulation up to 130MHz and 2GS/s ADC," 2014 IEEE International Solid-State Circuits Conference Digest of Technical Papers (ISSCC), Feb. 2014 (3 pages).
Ringbeck, T. et al., "A 3D Time of Flight Camera for Object Detection," Optical 3-D Measurement Techniques, Plenary Session 1: Range Imaging I, Jul. 2007 (10 pages).
Berkeley DeepDrive, 3D Object Detection based on Lidar and Camera Fusion, Research Summary, University of California, Berkeley, available at https://deepdrive.berkeley.edu/project/3d-object-detection-based-Lidar-and-camera-fusion (last accessed Aug. 31, 2020).

\* cited by examiner

SINGLE-CHIP RGB-D CAMERA

PRIORITY CLAIM CROSS-REFERENCE TO RELATED APPLICATIONS

This application is a 35 U.S.C. § 371 National Stage Application of PCT/EP2018/085578, filed on Dec. 18, 2018, which claims priority to U.S. provisional application No. 62/610,325, filed on Dec. 26, 2017, the disclosures of which are incorporated herein by reference in their entirety.

BACKGROUND

Three-dimensional (3D) imaging and mapping is widely used in robotics, computer vision, gaming, personal entertainment and many other areas. In most of these applications two chips are used. First, the 3D data is acquired by a 3D time-of-flight (ToF) infrared (IR) image sensor chip. Then the 3D data is mapped to or fused with two-dimensional (2D) images and/or videos obtained by a traditional 2D color imager chip. Exemplary systems are described in K. Shin, Z. Wang and W. Zhan, "3D Object Detection based on Lidar and Camera Fusion," University of California, Berkeley, available online at https://deepdrive.berkeley.edu/project/3d-object-detection-based-Lidar-and-camera-fusion; and in D. Pani Paudel, C. Demonceaux, A. Habed, P. Vasseur and I. S. Kweon, "2D-3D Camera Fusion for Visual Odometry in Outdoor Environments," in *IEEE/RSJ International Conference on Intelligent Robots and Systems* (*IROS* 2014), Chicago, 2014, the disclosures of which are incorporated herein by reference.

Utilizing a 3D sensor chip and a separate 2D imager chip adds to the software complexity and increases the power consumption of the digital processing unit. Furthermore, using two imagers requires alignment and calibration between the 3D and 2D color sensor in the physical implementation layer to enable post-processing or fusing of the 3D and 2D data. This requirement adds even more complexity and increases the fabrication cost. In some cases where the 3D data is acquired using two 2D imagers (two chips) based on triangulation, the same level of complexity and cost is added to the alignment and calibration of the two 2D cameras. In addition, using two 2D cameras requires even a larger processing and greater power consumption overhead for extracting the 3D information from the two 2D images using triangulation.

For these reasons there have been ongoing efforts to develop 3D time-of-flight and 2D image sensors on a single, preferably CMOS, chip. Examples of this approach are disclosed in W. Kim, W. Yibing, I. Ovsiannikov, S. Lee, Y. Park, C. Chung and E. Fossum, "A 1.5 Mpixel RGBZ CMOS Image Sensor for Simultaneous Color and Range Image Capture," in *International Solid-Sate Circuits Conference*, San Francisco, 2012; and S.-J. Kim, J. D. K. Kim, S.-W. Han, B. Kang, K. Lee and C.-Y. Kim, "A 640×480 Image Sensor with Unified Pixel Architecture for 2D/3D Imaging in 0.11 µm CMOS," in *VLSI Circuits* (*VLSIC*), 2011 *Symposium on*, Honolulu, 2011, the disclosures of which are incorporated herein by reference. The single chip devices are based on multiplexing between the 2D and 3D imaging modes, in which the visible light is imaged using a traditional image sensor where, for instance, red, green and blue (RGB) color filters are placed on top of the pixels to enable distinguishing the colors. Extra pixels are provided that are covered with a different optical filter, for instance in infrared (IR) spectrum, which are used with a modulated infrared source for time-of-flight imaging. In other instances the color filters can be transparent for infrared and time-multiplexing or can be employed to switch between two imaging modes. These prior approaches require an extra IR source (in addition to the visible flash light source that a 2D camera needs) and post processing steps on the CMOS chip to engineer its sensitivity to the IR spectrum, both of which add to the cost. A summary of the known 3D camera approaches is provided in FIG. 1.

The general architecture of a traditional flash time-of-flight (ToF) 3D camera is shown in FIG. 2. The ToF 3D camera includes a transmitter TX operable to modulate the amplitude of the light from an infrared (IR) laser as a series of pulses, in which the light is distributed to a scene using proper optical elements. The camera further includes a receiver RX, in which the reflected light from the scene is collected and imaged onto a sensor array, such as a photodiode array on a CMOS chip. A time delay, τ, of the electrical waveform (e.g. photodiode current) generated by each of the sensor elements, in response to the RX light, with respect to the original modulation waveform, in the TX light, is measured using electronic circuits. The distance, R, to each element of the scene is then calculated using the time delay according to Equation 1, where c is the speed of light.

$$R = \frac{1}{2} c \cdot \tau$$

3D imaging cameras of the type shown in FIG. 2 have been explored in R. Lange and P. Seitz, "Solid-State Time-of-Flight Range Camera," *IEEE Journal of Quantum Electronics*, pp. 390-397, 2001; A. Simoni, L. Gonzo and M. Gottardi, "Integrated Optical Sensors for 3-D Vision," in *Sensors*, 200; and D. Stoppa, L. Viarani, A. Simoni, L. Gonzo, M. Malfatti and G. Pedretti, "A 16×16-Pixel Range-Finding CMOS Image Sensor," in *Europian Solid-State Circuits Conference*, 2004, the disclosures of which are all incorporated herein by reference. However, such systems do not always provide sufficient information about the color and brightness of the scene. Thus, for applications that require both color and depth information, such as object recognition and machine vision, a separate conventional 2D imager is required to capture a color photo (e.g. a camera with RGB pixels) of the scene. After 2D and 3D image capture a digital image processing unit combines the information from the two cameras. This step can use large processing power and can be time consuming, which can be prohibitive to using these systems for real-time video performance.

To address these problems researchers have explored the development of single chip RGB+3D. In many cases near infrared light (NIR) with wavelengths on the order of 800 to 1000 nm has been used for range (3D) imaging. NIR has been the main choice due to two advantages it has over using visible light:

1) Near infrared light is not visible to the human eye.
2) The irradiance level of background sunlight in the near infrared wavelengths is lower than in the visible spectrum. Hence the background noise is lower. Lower background noise means better 3D measurement resolution.

However there are drawbacks to methods using infrared (IR). The first is that the methods require two light sources—a visible light source for color or RGB imaging and an infrared source for 3D imaging. Another drawback in previous RGB+3D systems and methods is that the sensing pixels must be sensitive to both infrared and visible light. Thus, most RGB+3D cameras employ four optical filters deposited on top of a CMOS pixel, one for each part of the optical spectrum of interest—red, green, blue and IR. Since part of each pixel/pixels area must be allocated to detecting IR this solution either requires reducing the fill factor of the camera (one of the essential figures of merit for camera systems) or increasing the effective pixel area to enable both color and depth images. Therefore the addition of an IR filter will increase camera size/area, assuming that the number of pixels in the camera is kept constant. The manufacturing cost to produce a digital camera is proportional to camera area and to the complexity to produce it. Hence a camera with an added IR filter will be more costly due to the additional production complexity to make the IR filter and the increased camera area. It should be further noted that in these prior systems, in order to ensure RGB image quality, capture of 3D images are not done at the same time but are time multiplexed, so that an RGB image is captured first and then a 3D image is captured or vice versa. In a new system, such as the system disclosed herein, it is desirable to eliminate the IR source and use only a visible light source or both 3D and standard imaging (RGB).

In an attempt to address the increased cost due to adding an IR filter, some RGB+3D cameras use existing RGB optical filters to detect IR, based on the fact that the RGB filters do not entirely reject IR but instead pass some fraction of light in the IR spectrum to the CMOS photo detectors. While removal of the IR filter reduces cost, performance of this solution suffers because all visible light in the RGB filters pass band becomes background light, thereby greatly increasing noise and degrading 3D measurement resolution. Additionally an IR light source is still required and the detectors suffer from lower quantum efficiency in IR band than the visible range which amplifies the effect of visible background light while weakening the signal in IR band. Again, in a new system it is desirable to eliminate the IR source and use only a visible light source or both 3D and standard imaging (RGB).

By way of further background, Lidar (Laser Imaging, Detection and Ranging) is a technology for finding distance to an object by measuring the time that it takes for a light wave to travel to that object and return. Lidar can be implemented in scanning or flash architectures. In the former case, a collimated beam of light scans the scene in a point-by-point fashion and creates a 3D point cloud that describes the scene. In a flash Lidar, however, the entire scene is illuminated at once and the distance to all points is measured simultaneously and in parallel. A combination of the two techniques where a subset of the points in the scene is measured in parallel can also be used.

One of the challenges in the implementation of the flash Lidars is to reduce the complexity of the receive pixels, as millions of them often have to operate on a single chip. This includes both the ToF measurement step and its digitization that has to happen either sequentially or in parallel for all the pixels. In prior art devices there have been two categories of solutions to this problem. In the first category, the properties of the waveform are used to convert the ToF to an intermediate analog electric parameter, such as charge or voltage, and then convert that to a digital number in a further step. Two examples for this category are presented in R. Lange and P. Seitz, "Solid-State Time-of-Flight Range Camera," *IEEE Journal of Quantum Electronics*, pp. 390-397, 2001; and A. Simoni, L. Gonzo and M. Gottardi, "Integrated Optical Sensors for 3-D Vision," in *Sensors*, 2002, the disclosures of which are incorporated herein by reference. One method relies on the sinusoidal modulation of the illumination source. Then, in the receiving pixels, four samples per modulation period are acquired and digitized and their values are used to extract the phase delay of the sinusoidal waveform in the return signal and calculate the ToF based on that. This method strongly depends on the sinusoidal shape of the modulation waveform to produce the correct result and cannot be trivially used with other modulation patterns such as pulsed (or square wave) modulation. Furthermore, it requires extra steps for digitization of the sampled values that adds to the complexity and reduces the precision by adding error in extra steps.

A different technique has been used for time-of-flight measurement that relies on the square-wave modulation of the illumination source. In that technique, the photocurrent generated by the return light is integrated in two separate time windows. The amount of accumulated charge in each window shows the overlap of the high-intensity part of the square-wave with them. Then, after digitization and some extra processing steps the ToF can be measured. Some other variants of these techniques are disclosed in R. Lange and P. Seitz, "Solid-State Time-of-Flight Range Camera," *IEEE Journal of Quantum Electronics*, pp. 390-397, 2001; A. Simoni, L. Gonzo and M. Gottardi, "Integrated Optical Sensors for 3-D Vision," in Sensors, 2002; D. Stoppa, L. Gonzo, M. Gottardi, A. Simoni and L. Viarani, "A Novel Fully Differential Pixel Concept for Indirect ToF 3D Measurement," in *Instrumentation and Measurement Technology Center*, 2003; L. Viarani, D. Stoppa, L. Gonzo, M. Gottardi and A. Simoni, "A CMOS Smart Pixel for Active 3-D Vision Applications," *IEEE Sensors Journal*, vol. 4, no. 1, pp. 145-152, 2004; B. Buttgen, T. Oggier, M. Lehmann, R. Kaufmann and F. Lustenberger, "CCD/CMOS Lock-In Pixel for Range Imaging: Challenges, Limitations and State-of-the-Art," 1*st Range Imaging Research Day*, 2005; D. Stoppa, L. Viarani and A. Simoni, "A 50×30-pixel CMOS Sensor for ToF-based Real Time 3D Imaging," IEEE Workshop CCD & AIS, 2005; D. Stoppa, L. Gonzo and A. Simoni, "Scannerless 3D Imaging Sensors," International Workshop on Imaging Systems and Techniques, Niagara Falls, 2005; D. Stoppa, L. Pancheri, M. Scandiuzzo, L. Gonzo, G.-F. Dalla Betta and A. Simoni, "A CMOS 3-D Imager Based on Single Photon Avalanche Diode," *IEEE Transactions on Circuits and Systems*, vol. 54, no. 1, pp. 4-12, 2007; S. Bellisani, F. Guerrieri and S. Tisa, "3D ranging with a high speed imaging array," in *Ph.D. Research in Microelectronics and Electronics,* 2010; M. Davidovic, G. Zach, K. Schneider-Hornstein and H Zimmermann, "ToF Range Finding Sensor in 90 nm CMOS Capable of Suppressing 180 klx Ambient light," in *IEEE Sensors,* 2010; G. Zach, M. Davidovic and H Zimmermann, "A 16 16 Pixel Distance Sensor With In-Pixel Circuitry That Tolerates 150 klx of Ambient Light," *JSSC*, vol. 45, no. 7, pp. 1345-1353, 2010; 0. Sgrott, D. Mosconi, M. Perenzoni, G. Pedretti, L. Gonzo and D. Stoppa, "A 134-Pixel CMOS Sensor for Combined Time-of-Flight and Optical Triangulation 3-D Imaging," *JSSC*, vol. 45, no. 7, pp. 1354-1364, 2010; A. Speckermann, D. Durini, W. Suss, W. Brockherede, B. Hosticka, S. Schwope and A. Grabmaier, "CMOS 3D Image Sensor Based on Pulse Modulated Time-of-Flight Principle and Intrinsic Lateral Drift-Field Photodiode Pixels," in *ESSCIRC,* 2011; D. Durini, A. Speckermann, J. Fink, W. Brockherde, A. Grambmaier and B. Hosticka, "Experimental Comparison of Four Different CMOS Pixel Architectures Used in Indirect Time-of-Flight Distance Measurement Sensors," in *Image Sensors Workshop,* 2011; M. Davidovic, M. Hofbauer, K. Schneider-Hornstein and H Zimmermann, "High Dynamic Range Background Light Suppression for a ToF Distance Measurement Sensor in 180 nm CMOS," in *Sensors,* 2011; R; Walker, j. Richardson and R. Henderson, "128×96 Pixel Event-Driven Phase-Domain $\Delta\Sigma$-Based Fully Digital 3D Camera in 0.13 µm CMOS Imaging Technology," in *ISSCC*, 2011; D. Milos, M. Hofbauer and H. Zimmermann, "A 33×25 µm² Low-Power Range Finder," in *ISCAS*, 2012; D. Bronzi, S. Bellisai, B. Markovic, G. Boso, C. Scarcella, A. Della Frera and A. Tosi, "CMOS SPAD Pixels for Indirect Time-of-Flight Ranging," in *Photonics Conference*, 2012; M. L. Hafiane, W. Wagner, Z. Dibi and O. Manck, "Depth Resolution Enhancement Technique for CMOS Time-of-Flight 3-D Image Sensors," *IEEE Sensors Journal*, vol. 12, no. 6, pp. 2320-2327, 2012; K. Yasutomi, T. Usui, S.-M. Han, T. Takasawa, K. Kagawa and S. Kawahito, "A 0.3 mm-Resolution Time-of-Flight CMOS Range Imager with Column-Gating Clock-Skew Calibration," in *ISSCC*, 2014; C. Niclass, M. Soga, H. Matsubara, M. Ogawa and M. Kagami, "A 0.18-m CMOS SoC for a 100-m-Range 10-Frame/s 200 96-Pixel Time-of-Flight Depth Sensor," *JSSC*, vol. 49, no. 1, pp. 315-330, 2014; E. Tadmor, A. Lahav, G. Yahav, A. Fish and D. Cohen, "A Fast-Gated CMOS Image Sensor With a Vertical Overflow Drain Shutter Mechanism," *Transaction on Electron Devices*, vol. 63, no. 1, pp. 138-144, 2016; J. Illade-Quinteiro, V. Brea, P. Lopez and D. Cabello, "Time-of-Flight Chip in Standard CMOS Technology with In-Pixel Adaptive Number of Accumulations," in *ISCAS*, 2016, the entire disclosures of which are all incorporated herein by reference. All of the methods disclosed in these references are referred to as indirect ToF (I-ToF) measurement.

In the second category, the ToF is measured in a more direct manner and is often referred to as direct ToF technique (D-ToF). The modulation waveform for the methods in this category is often a train of short light pulses that is sent to the target. In the receiving pixels the arrival edge of the return pulse marks a time event that is then digitized using a time-to-digital converter (TDC). Work in this category is presented in F. Villa, R. Lissana, D. Tamborini, B. Markovic, A. Tosi, F. Zappa and S. Tisa, "CMOS single photon sensor with in-pixel TDC for time-of-flight applications," in *Workshop on Time-to-Digital Converters (NoMe TDC)*, Nordic-Mediterranean, 2013, the disclosures of which are incorporated herein by reference. These methods extract the ToF information only from rising or falling edges of the return waveform and for this reason their accuracy has strong dependency on the sharpness of these edges. Furthermore the receiving pixels should be able to accommodate such sharp events which add to the complexity.

A general schematic of a 3D camera is shown in FIG. 3 that includes a transmit section TX that sends the TX light to the target, and a receive section RX that collects the reflected RX light from the target and measures its time-of-flight. One way to create a point cloud of a scene is to scan it sequentially with the light from the source, as shown in the figure. In that case a single detector or small sub-array of detectors can be used to construct the 3D image in a point-by-point or piece-by-piece manner Another way is to flood the whole scene at once and an array of detectors collect the light from the corresponding pixels to create a complete 3D image. In this case the beam steering unit can be eliminated and the TX optics can be modified to expand the light beam (like a cone) to cover the whole scene.

For time-of-flight measurement, different parameters of the transmit TX light, such as its intensity or amplitude, phase or frequency, might be modulated based on the architecture of the Lidar. The time-of-flight measurement methods provided in the present disclosure are suitable for use with any intensity modulation scheme such as sinusoidal, square-wave or pulsed modulation. FIG. 4 further illustrates the operation principle of an intensity modulated Lidar for a case where the modulation signal is a square-wave. In particular, the ToF translates to a time delay T in the received signal with reference to the transmit signal which can be used to find the range R using Equation 1 above. It is noted that the factor of one-half in Equation 1 is due to the fact that the time delay T is caused by the round-trip delay of the light to the target, so that the range is equal to half of the distance that the light signal actually travels.

An efficient ToF measurement technique is of central importance in Lidars, which becomes challenging in flash Lidars when millions of such measurements should be performed in parallel in the imaging pixels. Most of the prior art methods digitize the output of millions of pixels by placing the digitization circuitry outside of the pixels. Locating the digitization outside enables smaller pixels and thus better lateral resolution and sensitivity. However, off-loading the digitization comes at the cost of reduced imaging speed. In certain cases where imaging speed is important the timing is measured in the pixels with dedicated circuitry, as disclosed in Texas Instruments, *OPT8241 3D Time-of-Flight Sensor*, 2015, which document is incorporated herein by reference. However, the additional circuitry results in larger pixel size and smaller fill factor which reduces the sensitivity. What is needed for ToF Lidar systems is relatively simple circuitry to resolve the ToF with comparable accuracy.

SUMMARY OF THE DISCLOSURE

In accordance with the present disclosure, a system and method is provided that overcomes the problems with the prior approaches discussed above. In particular, the present system and method contemplates sensing time-of-flight (3D) with the visible light spectrum and multiplexing the image sensor between 2D color imaging, and 3D time-of-flight imaging modes as a function of time. For simplicity, in one aspect the present system is referred to as an RGBvD system, corresponding to RGB color sensor with Visible light spectrum 3D imaging system or sensor.

The RGBvD system disclosed herein provides the following advantages over prior stereo cameras (two 2D imagers using two chips based on triangulation):
1) Much smaller with better depth resolution than stereo cameras can achieve;
2) Lower overhead and cost. Using a single imager removes triangulation calculations, extra components and packaging costs.

The RGBvD system disclosed herein provides the following advantages over prior systems utilizing two chips (one chip for RGB and one chip for IR 3D sensing, as exemplified by the Microsoft Kinect® device):
1) Enables both color imaging and 3D imaging on a single chip.
2) Lower overhead and cost;
  a. Using a single imager removes need to calibrate or fuse 2D and 3D images coming from the two imager chips;
  b. No need for extra 3D IR imager chip, IR source and extra lens for 3D IR imager.

The RGBvD system disclosed herein provides the following advantages over existing two RGB+D chip solutions (one chip for RGB plus one for IR 3D sensing):
1) Uses Visible light
  a. No need for extra on chip IR filter reduces chip processing cost;
  b. No need for extra IR light source. Reduces cost of the 3D sensing system.

The RGBvD system disclosed herein uses visible light instead of infrared, and performs time-multiplexing between color and depth imaging modes to enable collection of both 2D and 3D images at the lowest possible cost.

In one aspect of the present disclosure, the RGBvD system uses a modulated visible light source, such as the flash of a typical 2D camera on a cell phone, for depth imaging and time multiplexing between color and depth imaging. During the color imaging the flash light can either be continuously off (e.g. when imaging in daylight) or continuously on (e.g. imaging at night), whereas during the depth imaging the intensity of the light source can be modulated for time-of-flight (ToF) measurement. The modulating frequency of the light source is outside the bandwidth of the human eye so that the visible light source during 3D imaging will appear to be a constant faint light coming from the camera. In addition, the camera can alternate between the two modes to produce a continuous stream of color and depth images that can be overlaid without the need for any post-processing software. The RGBvD system and methods disclosed herein can implement methods to measure 3D depth described in more detail below, or can use other known measurement methods for ToF such as the methods described in documents incorporated by reference above.

The RGBvD system and method disclosed herein will result in a low cost 3D+RGB camera solution because it removes the need to use high cost CMOS imager integrated circuit processes that have IR filters. Furthermore the present RGBvD system and method eliminates the need for an additional IR source used in current 3D solutions.

In a further aspect of the present disclosure, the system and method described above, as well as other 3D camera systems and methods, can implement a novel time-of-flight (ToF) measurement system and method that allows simultaneous measurement and digitization of an intensity-modulated light wave's round-trip delay to a target. This has application in the Light-Detection And Ranging (Lidar) systems that are used to create a 3D point cloud of an object or a scene. One aspect of the method relies on the successive approximation of the integral symmetry point of the return light intensity on the time axis to determine the phase delay of the arrival signal with reference to the modulation waveform of the illumination source. The integral symmetry point is the point in the modulation period where the integral of the waveform for half-a-period to the right and left of that point are equal. Another aspect of the method of the present disclosure relies on sigma-delta (ΣΔ) modulation to find the time-of-flight. Compared to other indirect ToF measurement techniques, the present methods use simple circuitry that can be implemented in-pixel for large-scale 3D flash cameras where millions of pixels perform parallel ToF measurements to capture a full frame in a single shot. The present methods can also be implemented in a scanning 3D camera where pixels of a 3D picture are captured in a sequential manner using beam-steering techniques. Finally, unlike other methods that usually work only with a particular modulation waveform (e.g. square wave, sinusoidal, etc.), the present methods can work virtually with any intensity modulation waveform with circuit architectures that is compatible with the mainstream CMOS, CMOS imaging, and CCD technologies.

The systems and methods of the present disclosure provide inherent in-pixel digitization that simplifies the camera architecture and reduces the input-referred noise. Compared to the D-ToF technique this method uses the entire waveform of the modulation signal rather than its arrival edge to extract the ToF information. This reduces its sensitivity to the features of the modulation waveform and also reduces the complexity of the receiving circuitry. On top of all these benefits, the present systems and methods can be used virtually with any modulation waveform making them universal techniques that can be employed in the detection path of most of the systems regardless of their transmit pass architecture or modulation waveform.

DETAILED DESCRIPTION

Figure 1:
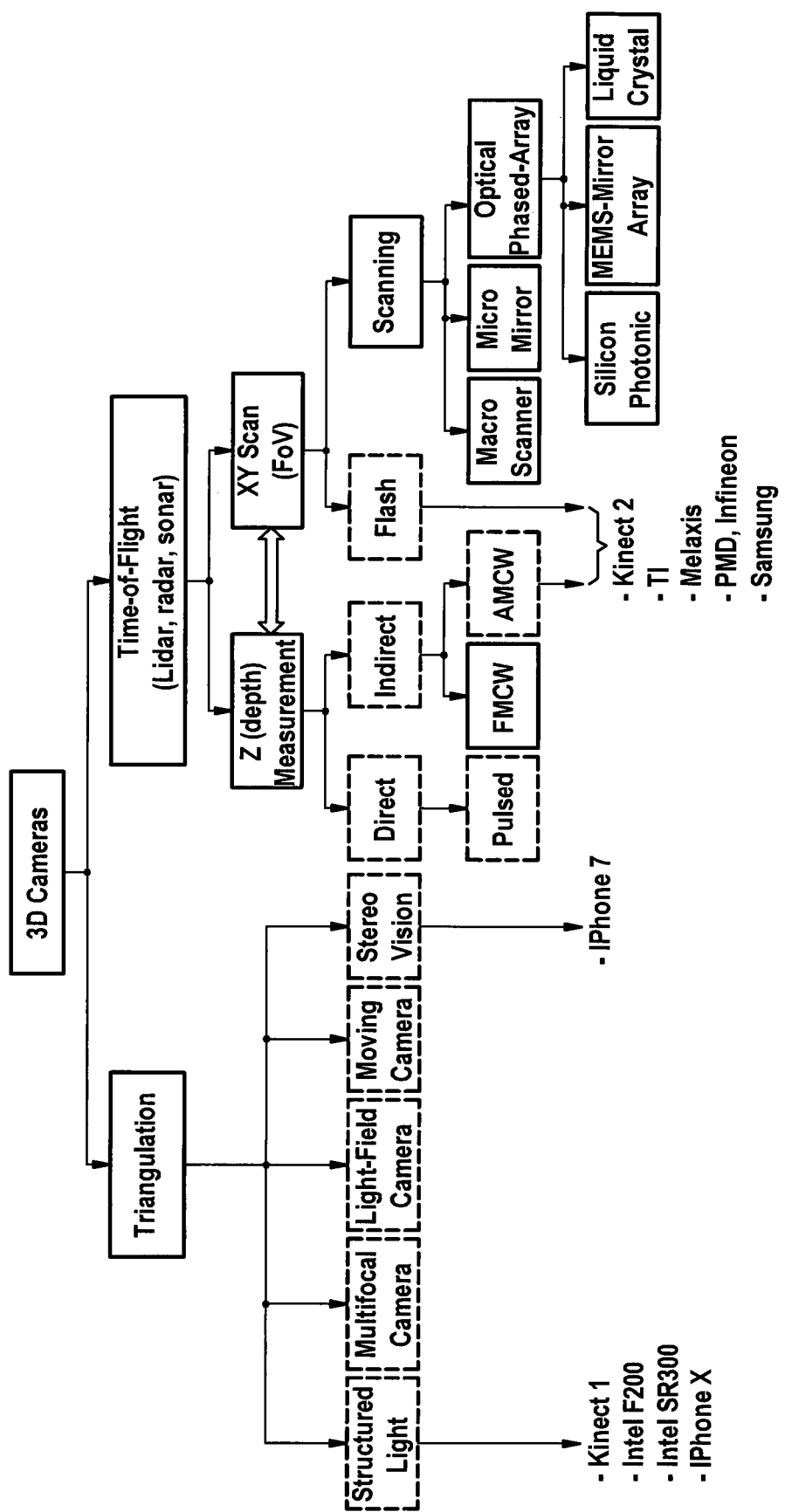
FIG. 1 is a chart of known 3D imaging methods.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Time Multiplexing Color Imaging Device

Figure 3:
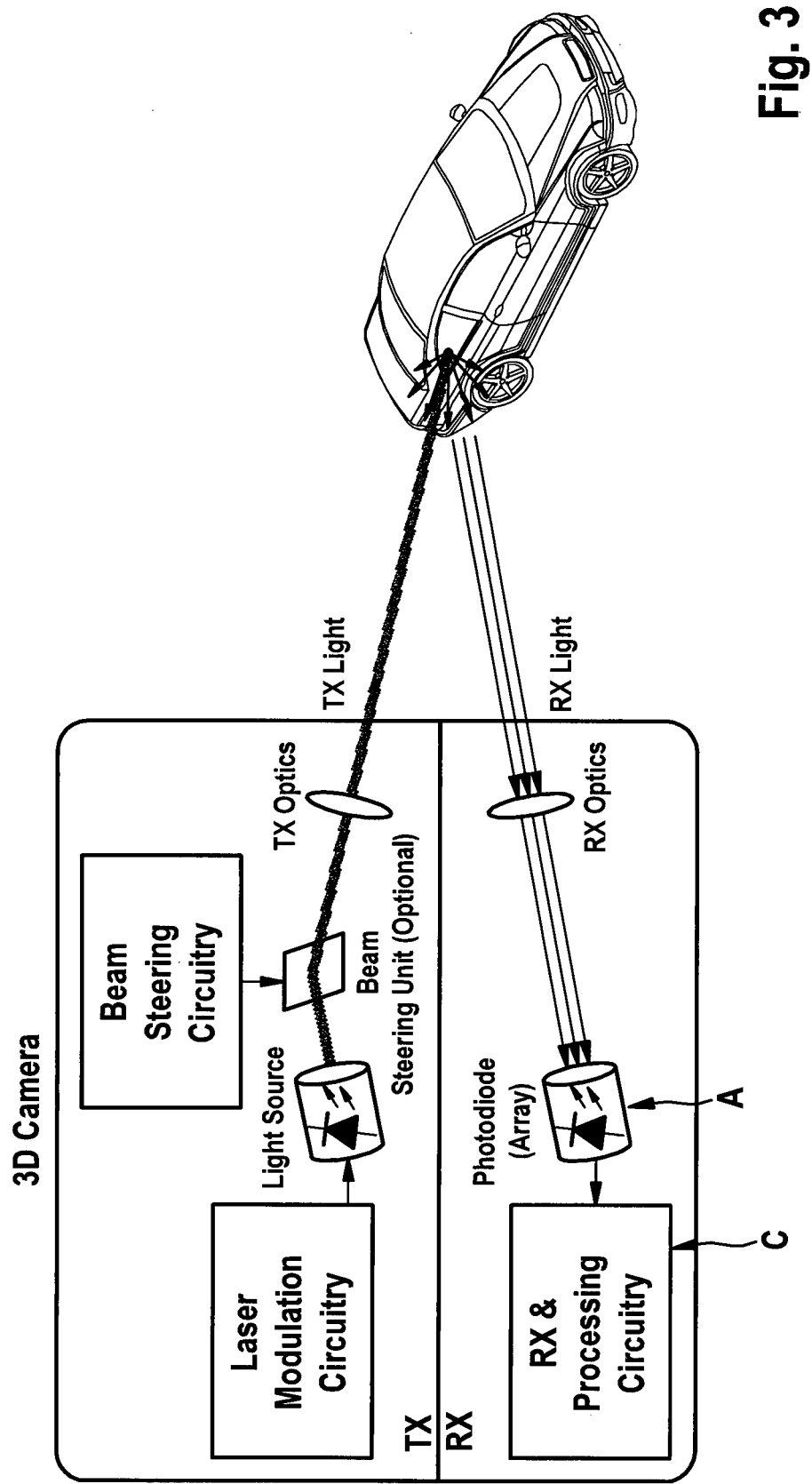
FIG. 3 is a diagram of a 3D camera and Lidar system.

The present disclosure contemplates sensing time-of-flight (3D) with the visible light spectrum and multiplexing the image sensor, such as the RX sensor in FIG. 3, between 2D color imaging and 3D time-of-flight imaging modes as a function of time. For simplicity, the present system is referred to as an RGBvD system, corresponding to RGB color sensor with Visible light spectrum 3D imaging system or sensor. In one aspect of the present disclosure, the RGBvD system uses a modulated visible light source, such as the flash of a typical 2D camera on a cell phone, for depth or ToF imaging and for time multiplexing between color and depth imaging. During the color imaging the flash or TX light can either be continuously off (e.g. when imaging in daylight) or continuously on (e.g. imaging at night), whereas during the depth imaging the intensity of the light source can be modulated for time-of-flight (ToF) measurement. The modulating frequency of the light source is outside the bandwidth of the human eye so that the visible light source during 3D imaging will appear to be a constant faint light coming from the camera.

Figure 5:
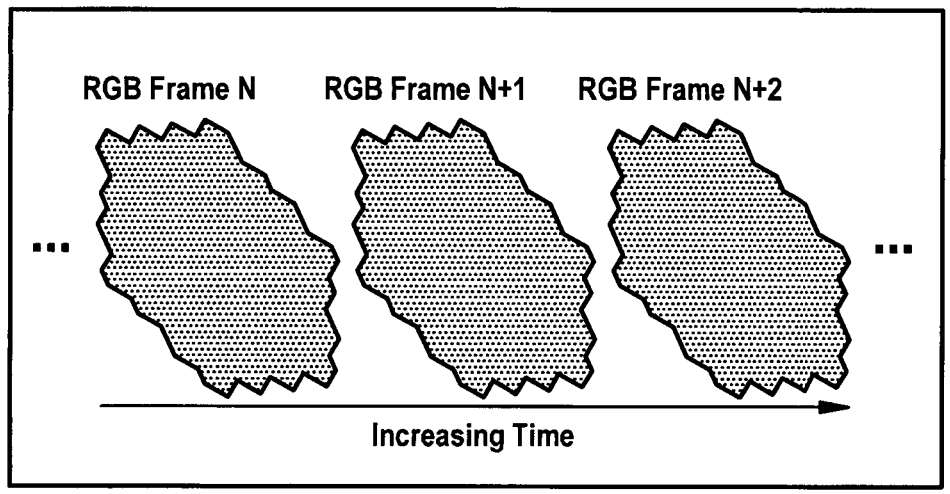
FIG. 5 is a diagram of time multiplexing for time-of-flight and RGB detection implemented by the system and method described herein.

In addition, the camera is configured to alternate between two modes to produce a continuous stream of color and depth images that can be overlaid without the need for any post-processing software, as depicted in FIG. 5. Thus, the 3D camera, such as the camera in FIG. 3, and particularly the RX and processing circuitry, or RX processor, of the camera, can be controlled, such as by circuitry or software, to multiplex between obtaining a color image in an imaging mode, such as in Frame N and Frame N+2, and obtaining time-of-flight (ToF) information in a ToF mode, such as in the intermediate Frame N+1, from the same transmitted TX light and the same RX light reflected from the object or scene being detected. The RGBvD system and methods disclosed herein can implement methods to measure 3D depth or ToF as described in more detail below, or can use other known measurement methods for ToF such as the methods described in the documents incorporated by reference above. The camera can have the architecture depicted in FIG. 3 in which the return signal is directed to a photodiode array A in which the output of each photodiode is processed by the RX processor C. In accordance with the RGBvD camera disclosed herein, the RX processor C is adapted to alternate between frames to store color images in the imaging mode and to generate and store ToF information in the ToF mode, all from the same TX signal.

Figure 4:
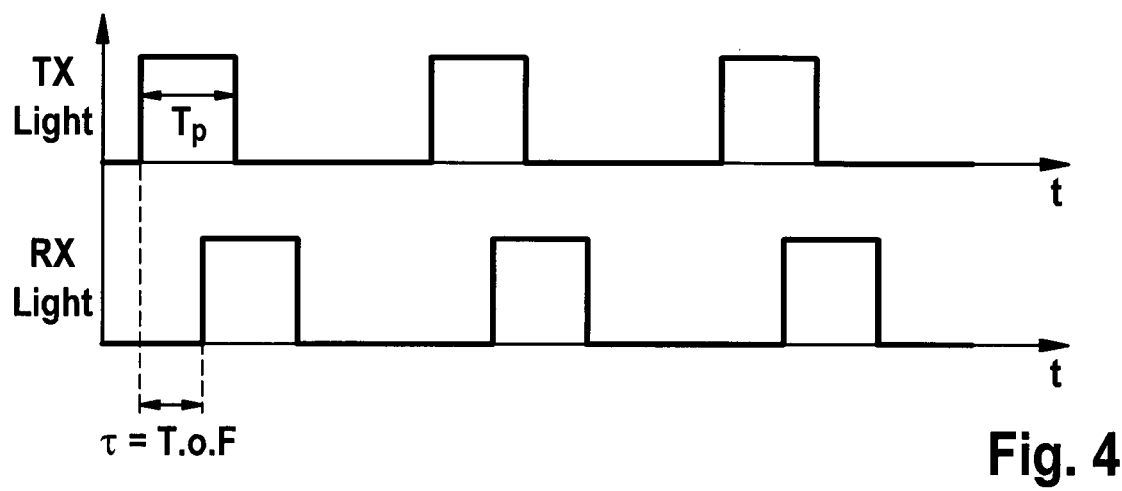
FIG. 4 is a graph of transmitted and received signals using the system shown in FIG. 3.
Figure 6:
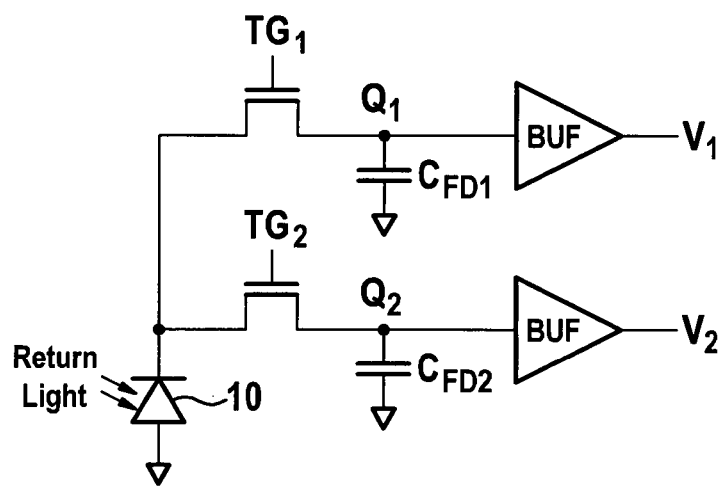
FIG. 6 is a circuit diagram configured for a time-of-flight determination.

A more detailed explanation starts with the basic circuit shown in FIG. 6 for measuring time-of-flight between the TX light and the RX light shown in the graph of FIG. 4. The circuit shown in FIG. 6 relates to a single light detector 10 at the RX sensor side of the camera shown in FIG. 3. The detector 10 can be a conventional RGB light detector or photodiode. The output of the detector 10 is supplied to a pair of transfer gates $TG_1$, $TG_2$ which, together with corresponding capacitors $C_{FD1}$, $C_{FD2}$ form an integrator for integrating or collecting charge from the detector 10. Charge $Q_1$, $Q_2$ is collected in each capacitor when the corresponding transfer gate is opened. When the gates are closed the charge in each capacitor can be outputted through a buffer BUF as corresponding voltages $V_1$, $V_2$. These voltages can be fed to corresponding A/D converters for use in calculating the time-of-flight within the RX processor C or within an external device to which the voltages $V_1$, $V_2$ (or the A/D converted digital values) are provided.

Figure 7:
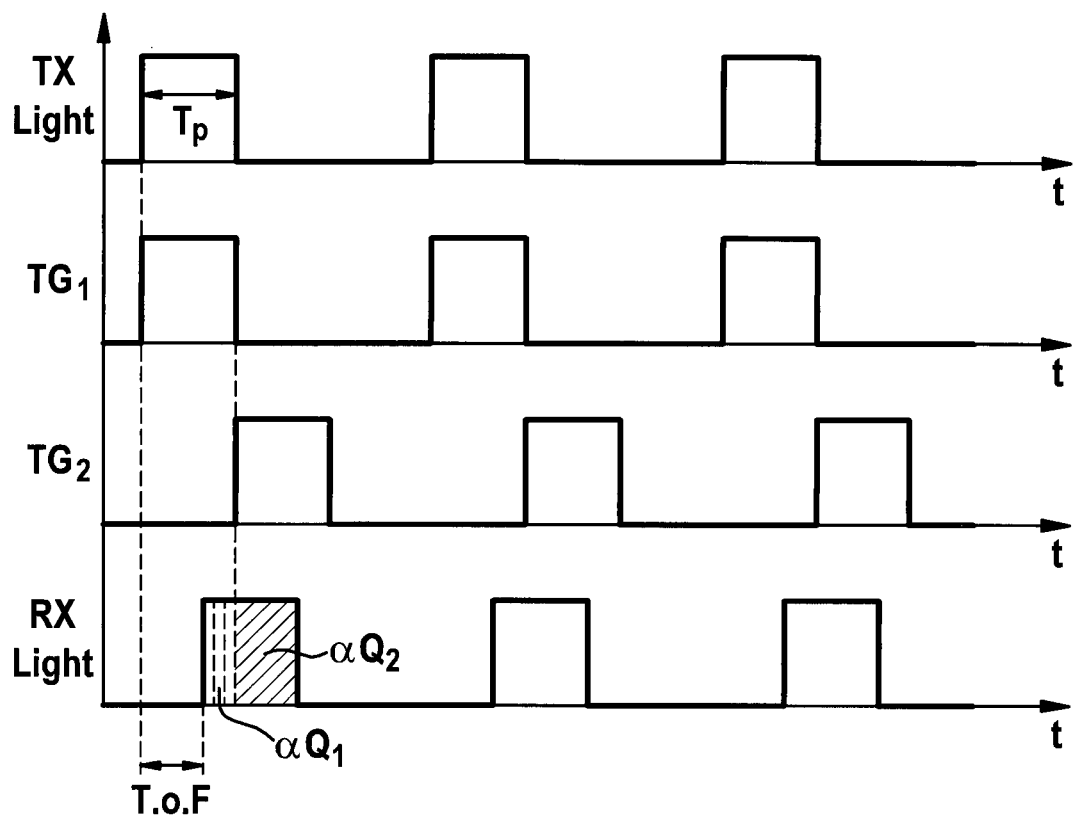
FIG. 7 is a timing diagram for operating the circuit of FIG. 6.

The transfer gates $TG_1$, $TG_2$ are activated or opened according to the timing chart shown in FIG. 7 in order to perform the integration necessary to determine the time of flight. As shown in FIG. 7, at the transmission of the TX light pulse the first transfer gate $TG_1$ is opened for a period equal to the length or time duration of the TX pulse T. As long as the transfer gate $TG_1$ is open, charge from the detector 10 collects as charge $Q_1$ in the capacitor $C_{FD1}$. At the end of the period $T_P$ the second gate $TG_2$ is opened for an equal time period $T_P$, during which time the charge $Q_2$ is collected in the capacitor $C_{FD2}$. It can be appreciated that when the transfer gates $TG_1$, $TG_2$ are opened, charge only accumulates in the corresponding capacitors when the RX sensor detects the reflected light. Thus, as shown in FIG. 7, the RX light is received at a time offset from the commencement of the TX pulse—i.e., the time-of-flight (ToF). As represented by the two shaded portions of the RX light in FIG. 7, the leading portion of the received RX pulse overlaps the $TG_1$ pulse by the charge $Q_1$, and the trailing portion of the RX pulse overlaps the $TG_2$ pulse by the second charge $Q_2$.

Figure 8A:
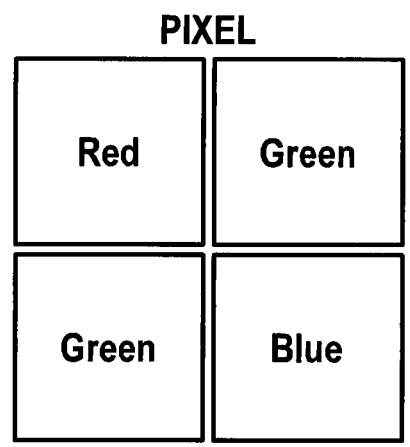
FIG. 8a is a diagram of a pixel array for use in the 3D camera of FIG. 3.
Figure 8B:
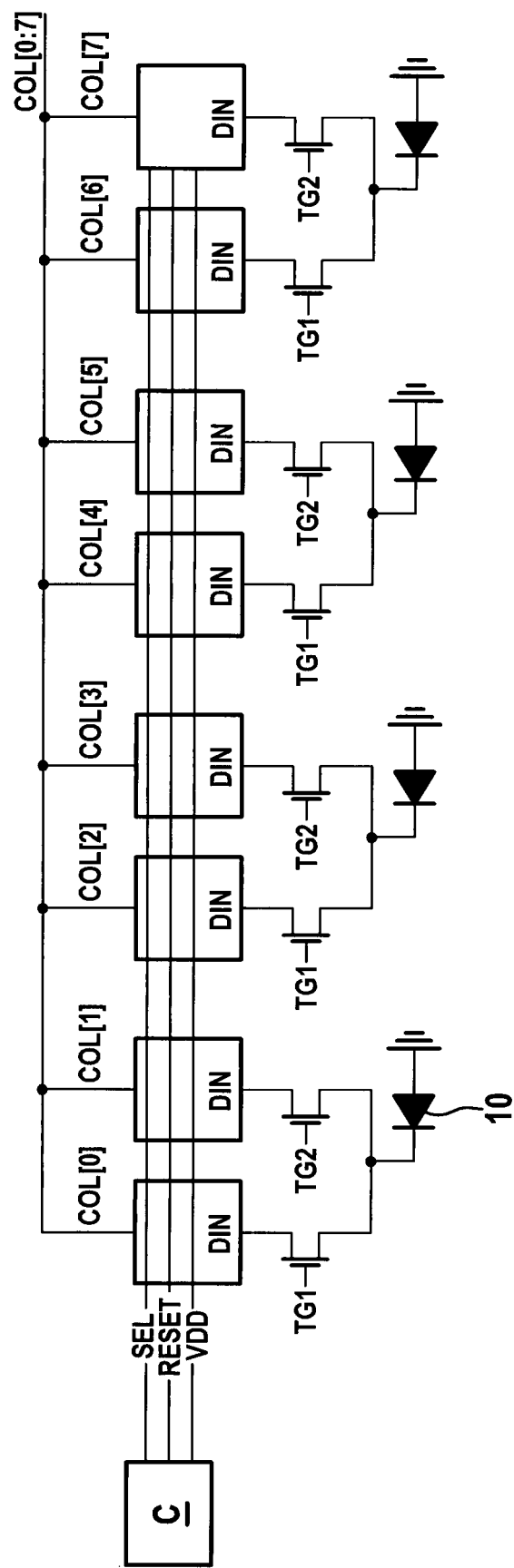
FIG. 8b is a circuit diagram configured for RGB light detection and ToF determination for the 3D camera of FIG. 3 according to one aspect of the present disclosure.
Figure 8C:
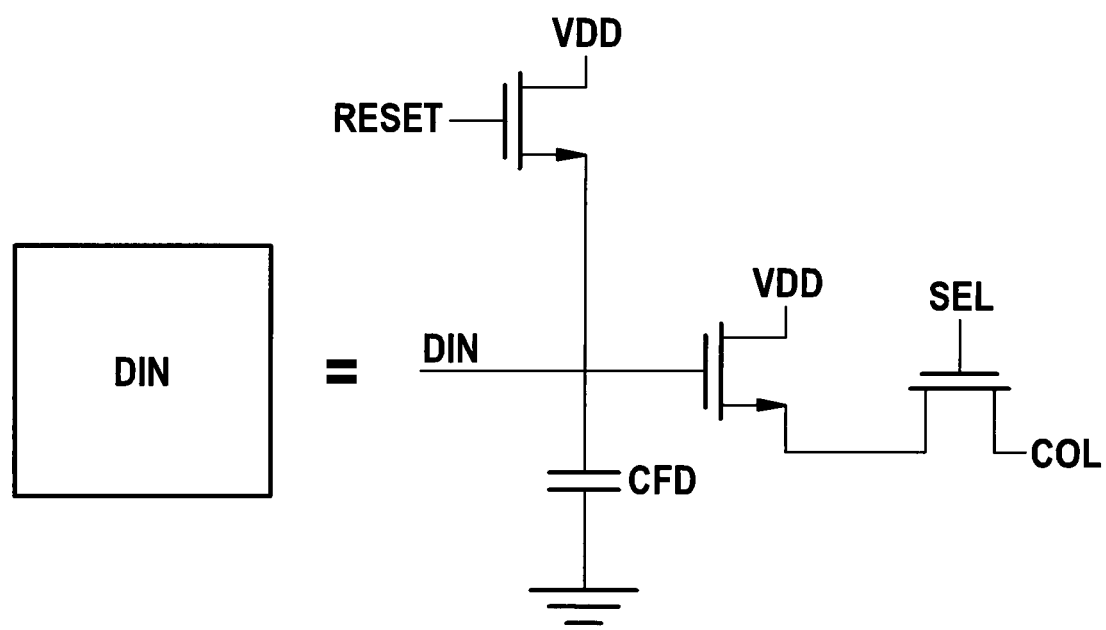
FIG. 8c is a circuit diagram of a capacitor circuit used in the circuit shown in FIG. 8b.

The circuitry for a 3-D camera according to the present disclosure is shown in FIGS. 8a-8c. The 3-D camera includes a plurality of pixel arrays, such as the pixel array shown in FIG. 8a. In the illustrated embodiment, a 2×2 array includes a detector tuned to detect red, green and blue light (RGB). The additional detector in the example can be calibrated to green light or to other frequencies or frequency bands. Each detector outputs a charge to a corresponding pair of transfer gates $TG_1$, $TG_2$ as discussed above, according to the circuit shown in FIG. 8b. The corresponding transfer gates pass the charge to a capacitor circuit DIN, which is shown in more detail in FIG. 8c. As shown in FIG. 8c, the capacitor $C_{FD}$ is connected to a base voltage VDD through a reset transistor and the charge of the capacitor is output to a data bus COL through a buffer including a select transistor SEL. As shown in FIG. 8b, each detector includes a pair of transfer gates $TG_1$, $TG_2$ and a pair of capacitor circuits as shown in FIG. 8c, and the output of each capacitor circuit is fed to a line COL(0), COL(1) . . . COL(7), of the data bus COL. Alternatively, the data bus can be a single data line with the output of each capacitor circuit providing a serial signal to the bus line COL.

According to the present disclosure, the circuitry of FIGS. 8b-8c is alternately used to detect the RGB image and to determine the time-of-flight to enable the 3-D aspect of the camera. In particular, the present disclosure contemplates multiplexing the operation of the circuitry over a series of TX pulses between image detection and ToF measurement, as discussed above with respect to FIG. 5. In particular, the input lines SEL, RESET, VDD and currents to the transfer gates $TG_1$, $TG_2$ for each capacitor circuit DIN are controlled by the RX processor C. The RX processor C can also control when the TX light is activated.

Figure 9:
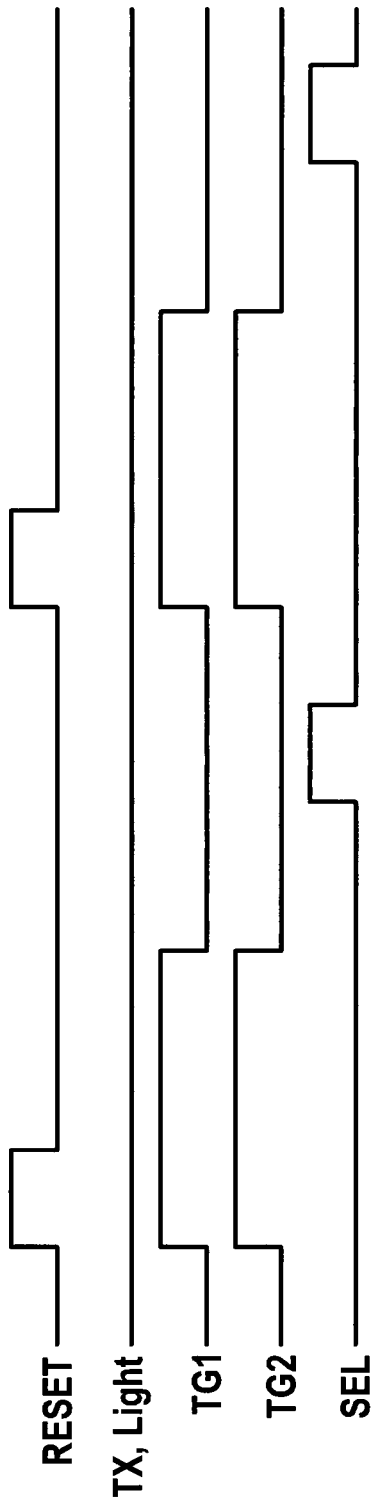
FIG. 9 is a timing diagram for operating the circuit of FIG. 8b to generate an RGB image.

When the circuitry of FIGS. 8b-8c is operated in the RGB imaging mode, RX processor C activates the RESET, $TG_1$, $TG_2$ and SEL inputs according to the timing chart shown in FIG. 9. It can first be appreciated that in the RGB imaging mode the TX light need not be activated, as indicated by the null TX Light signal in FIG. 9. In this instance, the image detection occurs under ambient lighting conditions in order to provide an accurate depiction of the captured scene. However, it is understood that in some cases additional light may be added to the scene, in which case the TX light may be activated continuously over the image sampling period.

Figure 2:
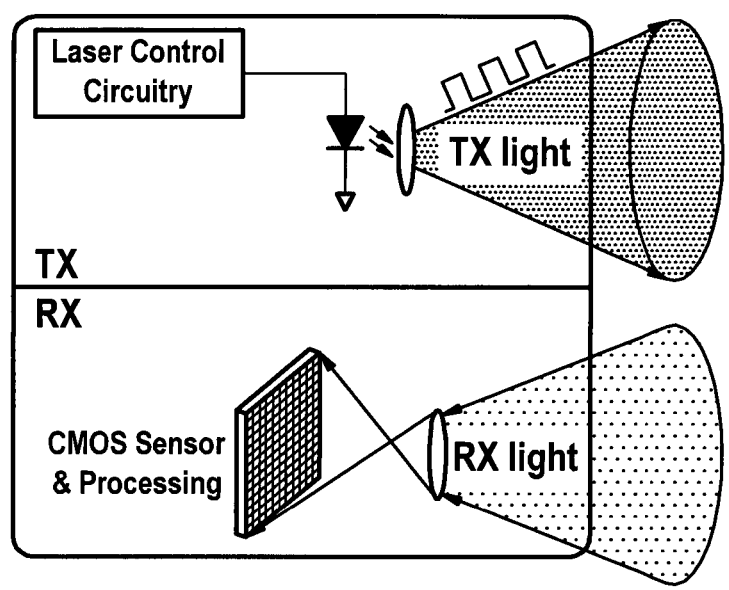
FIG. 2 is a diagram of a flash time-of-flight (ToF) 3D camera.

In the standard case, the RESET signal resets all of the capacitor circuits DIN so that no charge $Q_1$, $Q_2$ is present in any of the capacitors corresponding to the RGB detectors. Concurrent with the reset signal, the two transfer gates $TG_1$, $TG_2$ are activated so that charge from the corresponding detector is collected in each of the capacitors, $C_{FD1}$, $C_{FD2}$ (FIG. A). The charges are collected for a predetermined time that is particularly suited to accept enough light for accurate detection of the intensity of each of the red, green and blue components of light reflected from the scene. The transfer gates are closed after that predetermined time, and the SEL input is activated to pass the capacitor charge to the respective data bus line COL. In this color imaging mode it is anticipated that the charges in the two capacitors for each detector will be the same or substantially the same since the transfer gates for each capacitor circuit are opened for the same time period. Once the capacitor charges have been output to the data bus, the RESET signal restarts the cycle. The charge outputs in the data bus COL are passed through an A/D converter and supplied to the RX and Processing circuitry C (FIG. 2) to generate the color image of the detected scene and/or to an external device for further processing.

In order to provide depth to the color image, the time of flight information is generated in the second mode of operating the circuit of FIGS. 8b-8c. When the circuitry is operated in the ToF mode, the RX processor C activates the RESET, TX light, $TG_1$, $TG_2$ and SEL inputs according to the timing chart shown in FIG. 10. The RESET signal clears the capacitor circuits DIN of each detector and then upon transmission of the TX light signal, the transfer gate $TG_1$ of the first capacitor $C_{FD1}$ of each detector is open for the time period $T_P$ of the TX light pulse. The first transfer gate is closed and the second gate $TG_2$ opened at the end of the period $T_P$ and charge is accumulated in the second capacitor $C_{FD2}$ in the manner illustrated in the graph of FIG. 7. At some time after the TX pulse is transmitted, the detectors receive the reflected light signal RX, and it is this signal that is integrated through the two capacitors $C_{FD1}$, $C_{FD2}$, as discussed above. The SEL signal is provided at a predetermined time after transmission of the TX signal to discharge the capacitors to the corresponding bus line COL. The voltages on the bus lines for all of the detectors (namely the RGBG detectors in the present example) can be fed through an A/D converter and the digital information used to calculate the ToF for each detector.

Figure 10:
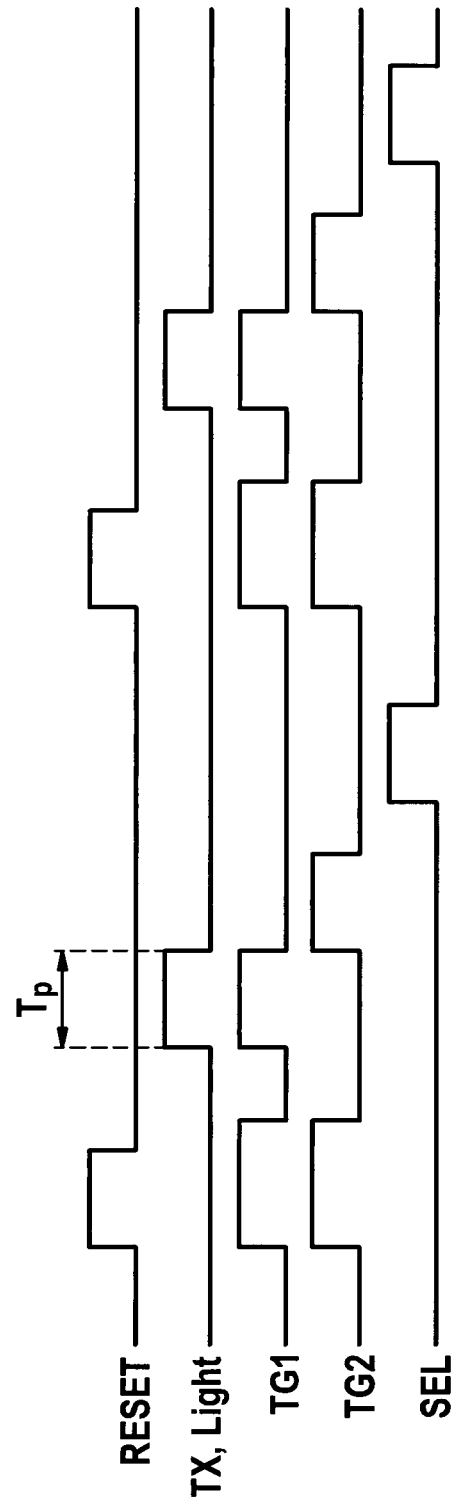
FIG. 10 is a timing diagram for operating the circuit of FIG. 8b to generating time-of-flight or depth information for the 3D camera of FIG. 3 according to one aspect of the present disclosure.

It can be appreciated that the same circuit shown in FIGS. 8b-8c generates its corresponding color signal and a ToF signal for each detector, depending upon the timing of the signals in FIGS. 9 and 10. Thus, the present disclosure contemplates that the RX and Processing Circuitry C of the 3D camera (FIG. 3) can be configured to generate the RESET, TX light, $TG_1$, $TG_2$ and SEL signals according to the standard imaging mode of FIG. 9 interleaved with generation of the RESET, TX light, $TG_1$, $TG_2$ and SEL signals according to the ToF mode of FIG. 10. The multiplexing cycle can occur at uniform intervals, such as alternating between modes at each RESET signal, or the ToF timing of FIG. 10 can be activated after 2, 3 or more cycles of the imaging mode timing of FIG. 9.

As seen in FIG. 10, the TX light signal is pulsed in order to set a baseline for measurement of the ToF between the TX light signal and the reflected RX light signal. The duration $T_P$ and frequency of the transmitted TX light pulse can be calibrated so that the light is not sensed by the observers. On the other hand, the duration $T_P$ is long enough so that sufficient light energy or photons are received by the detectors to charge the capacitors and provide an accurate measure of the timing difference ToF.

The multiplexing feature of the present disclosure can be implemented with various light sources for the TX light. The light source can be, for example, a single white light source or separate light sources with light centered on a particular wavelength or wavelength band (such as red, green, blue). Alternatively, the light source can be outside the visible spectrum with one of the light detectors in the pixel array of FIG. 8a corresponding to the non-visible light source, with the understanding that the alternative light source is only activated during the ToF part of the cycle. The light sources in the TX portion of the camera of FIG. 3 can be LEDs, VCESLs, lasers or other suitable light transmitters. The light detectors can be standard photodiodes or other devices capable of detecting the particular light signals. All of the components, including the circuits of FIGS. 8b-8c, can be provided on a common circuit board using conventional semiconductor fabrication techniques.

The multiplexing approach disclosed herein allows for the use of visible light, the same light source and the same light detectors for both image generation and ToF calculation. Since the same detectors that acquire the color image also provide ToF data, the ToF information is correct for each pixel array of the color camera—i.e., there is no parallax effect between the color image and depth ToF measurement. The multiplexing approach of the present disclosure thus allows for the use of a standard CMOS image sensor, CIS, or ASIC used for color image detection, with the control of the components dedicated to the RX processor or software. The processing circuitry must be coupled to the 3D camera light source (such as the flash of a smart phone or the like) to control the TX light pulse. The RX and processing circuitry C can be configured to receive the signal on the bus line COL and can correlate the ToF information for each sensor with the RGB information for that particular sensor to generate a 3D image.

Successive Approximation Time-of-Flight Measurement

In one embodiment of the present disclosure, a 3D camera, such as the camera depicted in FIG. 3, can incorporate RX processor C configured and adapted to perform a first method of the present disclosure for time-of-flight measurement identified as "Integral Symmetry Point (ISP) Successive-Approximation ToF (SA-ToF) Measurement." The processing circuitry C can include electronic circuitry, a microprocessor programmable to execute software instructions or a combination thereof, as well as circuitry dedicated to each photodiode or group of photodiodes. Prior 2D or 3D cameras rely on collecting charges from photodiodes, converting the collected charges to digital data and performing the time-of-flight calculations in the digital domain. On the other hand, the present disclosure determines ToF in the analog domain using circuitry dedicated to one or more photodiodes to integrate the collected charges from the photodiode(s). The ISP SA-ToF method relies on finding a point (i.e., a time instant) in the received signal RX during a single modulation period in which the integral under the signal curve to the right and to the left of the point within that period is equal—hence the integral symmetry point. For instance, with square modulation as depicted in FIG. 4, this point is in the center of the "high" state of the modulation. The ToF can be measured by comparing the timing of this ISP point in the received signal RX to the timing of the similar ISP point in the transmit signal TX. The ISP for the transmitted signal TX is known a priori because the transmit signal is generated and controlled in the camera.

In accordance with the present disclosure, the procedure for finding the exact position of the integral symmetry center for the received signal RX is performed in successive steps over multiple modulation cycles, hence the successive-approximation aspect of the SA-ToF measurement. The present method enables reuse of the same circuitry that in turn reduces the circuit complexity and footprint, in particular for use in flash 3D cameras. The modulation frequency is often orders of magnitude larger than the frame rate, hence performing the measurement in successive periods does not add any practical limitations.

Figure 11:
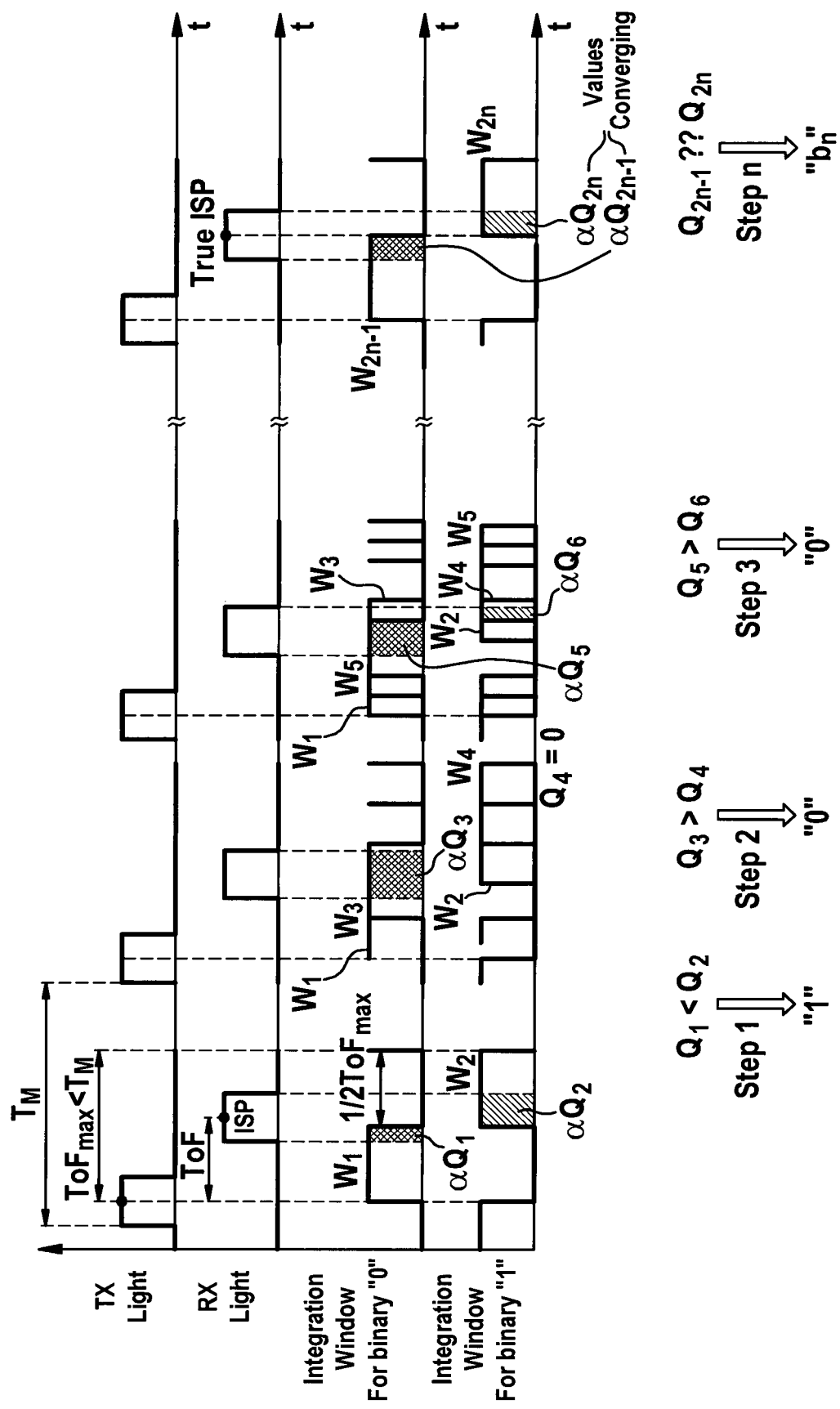
FIG. 11 is a graph of ToF measurements using successive approximation according to one aspect of the present disclosure.

The successive approximation method of the present disclosure is illustrated in the graph of FIG. 11. The present system and method is operable to find the ToF by measuring the timing of the integral symmetry point (ISP) of the received signal with reference to the same ISP point on the transmit signal TX. For simplicity it can be assumed that the modulation of the TX light and RX light both have a square-wave shape, but the present method can be applied to any other modulation waveform. The transmit signal that is sent to the target is shown on the top of FIG. 11 as TX light and the time-delayed received signal or RX light is shown below the TX signal. The integral symmetry point of the RX light is marked by a dot labeled ISP and is measured with reference to the integral symmetry point of the TX light, which is known a priori as the mid-point of the square wave. In accordance with the present disclosure, the result of the measurement is a binary number that can be compared to a full-scale binary number equal to a predefined maximum time-of-flight $ToF_{max}$ that the system is capable of measuring. The $ToF_{max}$ is necessarily less than the modulation period $T_M$ of the TX signal.

In the first step of the measurement, two integration time windows $W_1$ and $W_2$ are defined, each having a predetermined time duration equal to half of $ToF_{max}$, as shown in "Step 1" of FIG. 11. The time windows determine the time period over which the charge generated by the photodiode 10 in response to receiving the RX signal is accumulated or integrated, using analog circuitry as described herein. The initial time window pair $W_1$, $W_2$ commence at the ISP of the TX signal. The integral or accumulation of the photodiode charge within each window is determined, with the integral of the first time window $W_1$ named $Q_1$ and integral of the RX signal within the second time window $W_2$ named $Q_2$. In the embodiment illustrated in FIG. 11, $Q_2 > Q_1$ so it can be concluded that the RX signal has more overlap with the second time window than the first window. Hence it is then known that the ISP should occur in the second window $W_2$. In accordance with the present method, the presence of the ISP in the second window $W_2$ sets a first binary digit for this time-wise integration as a binary "1", as reflected below the timeline in FIG. 11. Note that if the ISP was present within the first window $W_1$, the first binary digit would have been a binary "0". The ensuing steps seek to shift the pair of time windows of ½ $ToF_{max}$ length to a point where the integral of the RX signal in each of the windows is equal, substantially equal or within a predetermined range.

Thus, in the second step it is determined whether the ISP is in the first half of the window $W_2$ or in the second half of that window. To make this determination, the time windows $W_1$, $W_2$ are redefined at the next TX signal in the same manner described above, and two new time windows $W_3$ and $W_4$ are also defined in a similar manner—i.e., having a time duration equal to half the $ToF_{max}$. However, unlike the first two windows, the new windows $W_3$, $W_4$ are defined so that the trailing edge of window $W_3$ and the leading edge of window $W_4$ are aligned in the middle of the redefined window $W_2$, as shown in "Step 2" of FIG. 11. In this example, the integral of the RX signal received by the photodiode 10 within new time window $W_3$, designated $Q_3$ (corresponding to the accumulated charge during this time window), is larger than the integral of the RX signal in time window $W_4$, designated $Q_4$, so the second binary digit is chosen to be "0".

In the third step, the time windows $W_1$, $W_2$, $W_3$ and $W_4$ are redefined at the next TX signal in the same manner as in the second step. New time windows $W_5$ and $W_6$ are defined in "Step 3" in the same manner as windows $W_3$, $W_4$ (i.e., each having a duration of ½ $ToF_{max}$), except that the boundaries of the two new windows are set to middle of the third window $W_3$, since the integral $Q_3$ is larger than $Q_4$. In the third step the integral of charge generated by photodiode 10 in response to the RX signal within time window $W_5$, designated $Q_5$, is larger than the integral of the RX signal within time window $W_6$, designated $Q_6$, hence the third digit is also set to binary "0". At the end of three steps, the ToF is with three digit precision is represented by a binary "100". At three digit precision, the binary value for the maximum time-of-flight $ToF_{max}$ is a binary "111". In this example and at three digit precision the integral symmetry point ISP for the received signal RX, from which the ToF value can be obtained, occurs in the fifth window or octant of the maximum measurable $ToF_{max}$ time interval. (It is noted that the first octant corresponds to "000" and the eighth octant corresponds to "111").

The precision of the measurement can be increased indefinitely by continuing these steps in which the boundary of the pair of integration windows moves closer and closer to the actual ISP as represented by "Step n" in FIG. 11. It is appreciated that after the first integrations, the boundary of each successive pair of integration windows $W_{2n-1}$ and $W_{2n}$ is set at the middle of the time window in the prior pair of time windows for which its integral, or accumulated charge, is greater than the integral for the other window of the pair. For instance, in the illustrated example leading windows $W_3$, $W_5$, etc. of the window pairs will always have the greater integral, at least until the boundary between the pair of windows reaches the ISP of the RX signal. On the other hand, if in the initial step of the process the integral of window $W_1$ had been greater than the integral of window $W_2$, the boundary of successive pairs of integration windows would have been aligned with the even-numbered windows $W_2$, $W_4$, etc.

In some embodiments, the measurement precision will be limited by the electronic circuit that performs the comparison of the integral values, $Q_{2n-1}$ and $Q_{2n}$ at "step n". Also the timing precision of the windows will be limited by the electronic clock or delay elements that are used to shift the integration time windows. In one specific example, adequate convergence of the window boundary line to the true ISP can be achieved after ten steps (n=10), which yields a 10 bit binary number from which the ToF can be calculated.

The relation between maximum time-of-flight $ToF_{max}$ and the modulation period, $T_M$ can be considered, so that in a hypothetical case if the ToF is zero, the first integration window in each step would move ahead on the time axis until the integration time window occurs entirely before the ISP of the transmit TX signal. In another scenario if the ToF is at its maximum then the second window would shift forward in time until it would occur entirely after $ToF_{max}$ ahead of the ISP of the TX signal. Since each window is equal to $½ToF_{max}$, this means the integration interval (consisting of two windows) for each step can extend from $½ToF_{max}$ before the ISP of the transmit signal up to $½ToF_{max}$ after the ISP+$ToF_{max}$. Therefore, the modulation period $T_M$ of the transmit and receive signals TX, RX should be at least equal to $2×ToF_{max}$ for the present method. If necessary, this extra required time can be eliminated by adding redundancy to the integration windows and also pixel circuitry in which case the modulation period $T_M$ can shrink to be equal to $ToF_{max}$.

An exemplary circuit implementing the methods described above is shown in FIG. 12 The exemplary circuit can be associated with each pixel or photodiode or a photodiode array, or can be associate with groups of pixels/photodiodes. It can be appreciated that the present disclosure contemplates performing the ToF determination using analog circuitry, without the necessity of performing an analog-to-digital conversion as in prior camera ToF systems. In one embodiment, the circuitry includes two gated integration blocks 12, 14 that receive the signal or charge from the photodetector 10 generated in response to reception of the RX signal. It is understood that the integration blocks can be constructed according to the circuitry shown in FIG. 6 that uses transfer gates and capacitors to store charge from the photodetector. The transfer gates of integration blocks 12, 14 are activated in accordance with each of the pairs of integration time windows $W_1$, $W_2$, etc., to integrate or accumulate the photodiode charge within the window, as discussed above. The integration block 12 is activated during time window $W_{2k-1}$, while the second integration block 14 is activated during the later time window $W_{2k}$, where "k" represents the "step" number (see FIG. 11). Thus, the integration blocks can be implemented using switch-capacitor circuits to integrate the photocurrent from the sensor (photodetector 10) into charges $Q_{2k-1}$ and $Q_{2k}$. The integrated values or charges $Q_{2k-1}$ and $Q_{2k}$ are then compared using a comparator 16 and the analog voltage corresponding to a binary "0" or "1" is sent to a control module 18. The control module 18 increments the "step" number "k" and sets the times for the two integration windows $W_{2k+1}$, $W_{2k+2}$ for the next cycle that commences on receipt of the next TX signal. The new time windows are provided to the two integration modules 12, 14. One exemplary way to implement this function of the control module 18 is to connect a high-frequency clock signal to a digital counter and create the time windows $W_{2k+1}$, $W_{2k+2}$ at particular numbers at the output of the counter. These particular numbers can then be updated digitally in order to set the timing for $W_{2k+1}$ and $W_{2k+2}$.

The control module 18 can be configured and operable to convert the analog output of the comparator 16 to a binary "0" or "1". A memory block or shift register 20 can hold the comparison result from each step for final binary output for the pixel, with the result of the first comparison at "Step 1" occupying the most significant bit position and the last comparison occupying the least significant bit position. It is understood that the output will be a binary number of n bit length, where n corresponds to the number of integrations performed by the integration blocks 12, 14. This output is supplied to a processor within the Rx circuitry C to perform the ToF calculation.

Alternatively, the shift register 20 can include series capacitors corresponding to the digits of the binary number, with the analog output of the comparator supplied to the "$k^{th}$" series capacitor under control of the control module 18. The series capacitors can be converted to the binary number of n bit length using a sample-and-hold peak detector or similar component.

For the time-of-flight (ToF) calculation, the binary output number $b_0b_1 \ldots b_n$ can be compared to the binary value for the maximum ToF measurable by the subject device. By definition, the maximum binary value for the maximum ToF is $111 \ldots 1_n$ with this binary value representing the actual time value for the maximum measurable ToF. The measured ToF is thus the ratio of the binary output $b_0b_1 \ldots b_n$ from the circuit shown in FIG. 12 and the maximum binary ToF number $111 \ldots 1_n$ multiplied by the actual maximum $ToF_{max}$ time value that is known by design. Thus, the processor within the RX processor C can be configured to compare the two binary values, perform the multiplication of the ratio to the maximum $ToF_{max}$ time value and provide an output indicative of the actual time-of-flight value for the particular pixel/photodiode or group of pixels/photodiodes. This output can be a sensible output, such as a visual display, or can be an output signal provided to a processing device, such as a Lidar, or an image or video processing device. In the three digit example discussed above, the binary value in the output register 20 is "100", compared to the maximum ToF binary value of "111". The binary ratio is thus "100/111" or decimal 4/7, which means that the actual measured ToF is 4/7 of the predetermined time for $ToF_{max}$.

One variant of this circuit can integrate or accumulate both charges $Q_{2k-1}$ and $Q_{2k}$ on the same capacitor, such as the capacitor $C_{FD1}$ in FIG. 6, but with different polarity for the charge accumulated in the later time window, so that the charge accumulated in the capacitor essentially subtracts the second charge from the first charge. The final charge over the two time windows in the capacitor is compared to a reference potential equal to the initial potential of that capacitor to determine if the charge with positive or negative polarity was larger. This technique can have two benefits. Firstly, it can cancel the effect of background light in the subtraction process, which reduces the required range for the comparator common mode. Secondly, it eliminates the mismatch error across the two integrating channels by using the same integration element (capacitor) for both time windows.

Figure 12:
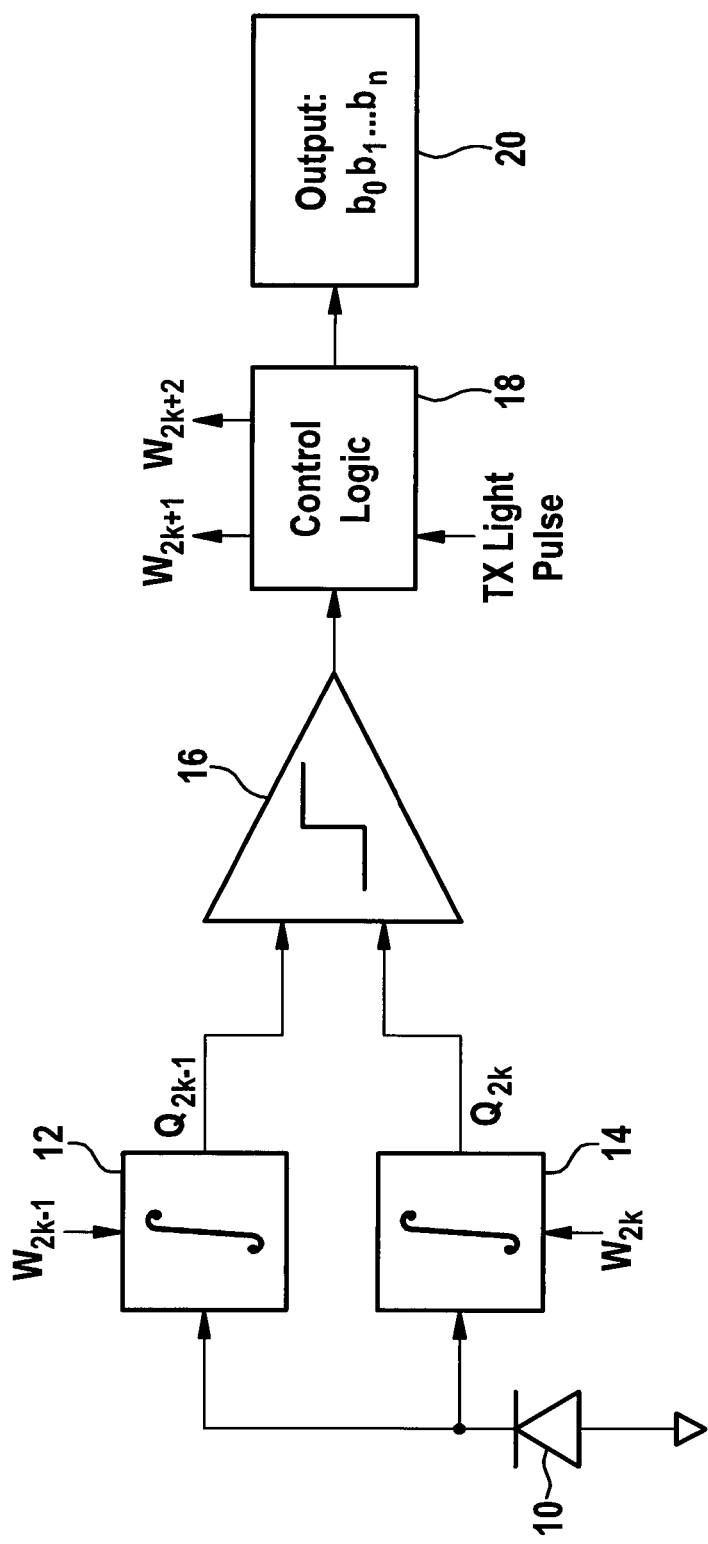
FIG. 12 is circuit diagram of a circuit for performing the successive approximation shown in the graph of FIG. 11, according to one aspect of the present disclosure.

The algorithm disclosed herein as embodied in the graph of FIG. 11 and as performed by the circuit shown in FIG. 12 relies on the overall time for the integration steps being short enough so that the objects in the scene do not have noticeable motion to disturb the measurement. A sufficiently short overall time is possible because the modulation period $T_M$ can be only a fraction of a microsecond and the frame-rate of most 3D cameras can be tens of millisecond. In one specific embodiment, the number of integration steps that sets the number of bits for the ToF measurement can be less than 10. Hence the time spent per conversion step can be much larger than a fraction of microsecond. This feature allows repeating the integration windows for each conversion step multiple times and accumulating more electric charge before performing the comparison between the charges. Larger accumulated charge can relax the requirements on the comparator design and positively influence critical parameters such as power consumption for each pixel. This can be important when the circuit is implemented in a flash camera where the amount of light per pixel is small (hence less charge can be accumulated) and millions of pixels work simultaneously, hence their power consumption should be limited. Furthermore, the repetition of the integration per conversion step can help average the white noise caused by the detection shot noise and thermal noise from the electronic front-end. This consequently improves the precision of the ToF measurement. According to the possible modulation period and typical frame rates in 3D cameras, tens of thousands of integration windows can be accumulated before performing the comparison for each conversion step.

The control module 18 of the circuit in FIG. 12 can include circuitry and/or firmware that is configured and operable to determine the time windows at each step "k". The outputs $W_{2k+1}$, $W_{2k+2}$ can represent activation windows for the transfer gates $TG_1$, $TG_2$ (FIG. 6) for each integration module 12, 14. The durations of the time windows are pre-determined based on the length of $ToF_{MAX}$ and can be "hard-wired" into the control module or accessible to the control module 18. The control module is further configured and operable to determine which of the prior time windows is bisected by the boundary between the next pair of time windows. Certain aspects of the algorithm represented by FIG. 11 executed by the control module 18 can be delegated to a central control module, such as look-up table for the length of $ToF_{MAX}$.

It can be appreciated that the circuit of FIG. 12 can be incorporated into the circuit shown in FIG. 8b for use in multiplexing between RGB color imaging and ToF determination. In that instance, the comparator 16 and control module 18 can be integrated between the capacitor circuit DIN and the output bus line COL, with the binary output 20 provided on the bus line. Rather than the two outputs (e.g., COL(0), COL(1)) for each pixel, a single output would be provided corresponding to the binary output 20. It can further be appreciated that the RX and processing circuitry C can be configured to actuate the components according to the ToF timing diagram of FIG. 10 for several cycles as needed to achieve convergence of the integration. For example, the circuitry C can operate to execute one RGB color imaging sequence according to timing diagram of FIG. 9 followed by seven cycles of the ToF timing sequence of FIG. 10, with this pattern repeating throughout the imaging process. Alternatively, the circuitry C can be configured to detect convergence before the predetermined number of ToF timing cycles (such as seven in the example) and to terminate the ToF timing sequence and execute the RGB color detection timing sequence.

ΣΔ Charge Accumulation for Time-of-Flight Measurement

Figure 13:
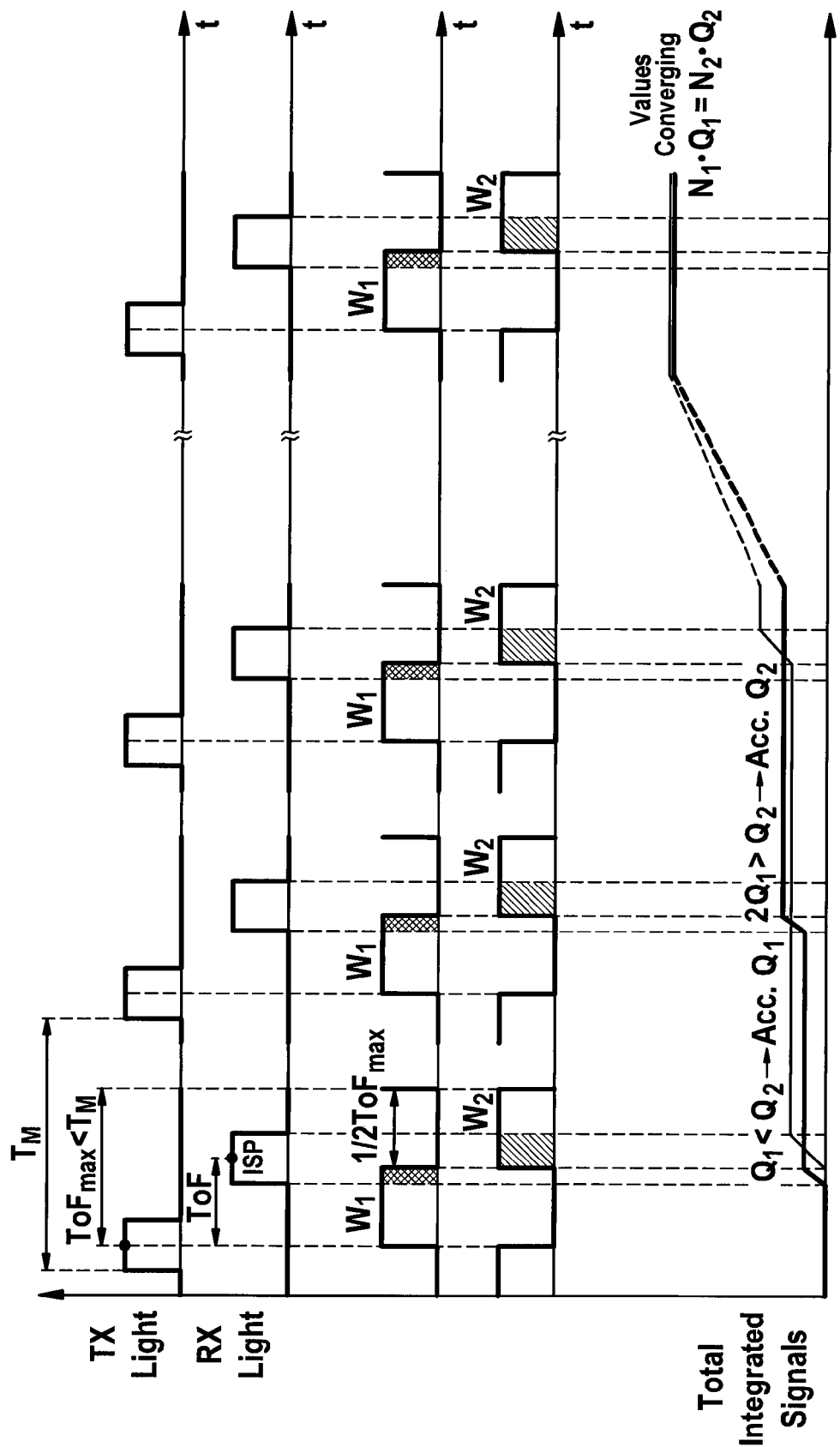
FIG. 13 is a graph of ToF measurements using sigma-delta modulation according to another aspect of the present disclosure.

A second method of the present disclosure can be identified as "ISP approximation with ΣΔ Charge Accumulation for ToF Measurement", as depicted in FIG. 13. In this method the integration window for each step remains the same—i.e., does not shift in relation to the TX, RX signals over time. Instead, the accumulation of the photodiode charge in response to receipt of the RX signal toggles between the two windows based on the overall accumulated signal. In the first step the two time windows $W_1$, $W_2$ are defined as described above in relation to the integration symmetry point ISP as shown in FIG. 11, namely having ½ $ToF_{max}$ duration and commencing at the ISP of the transmitted TX signal. The charge of the photodiode 10 in response to the RX signal is integrated or accumulated in each time window, $Q_1$, $Q_2$. Both $Q_1$ and $Q_2$ are stored in separate memories, such as analog memories or capacitors within the respective integration modules. In the example shown in FIG. 13, since $Q_2 > Q_1$, only the charge for the first window $W_1$, $Q_1$, gets a second accumulation, designated $2Q_1$, while $Q_2$ remains the same. In other words, charge accumulation in the first time window is determined in the next step, or more precisely the incoming RX signal is only integrated in the first window and stored in its corresponding memory, while the charge for $Q_2$ remains the same. In the second step, $Q_2$ is compared to $2Q_1$, and since $Q_2 < 2Q_1$, (i.e., second charge accumulation of the first window exceeds the unchanged charge of the second window) the charge accumulated during the second time window $W_2$, $Q_2$, gets an extra accumulation, designated $2Q_2$, while the second accumulation for window $W_1$, $2Q_1$, remains the same.

The method then continues with the same logic, with two counters keeping track of the number of accumulations $N_1$ and $N_2$ for each of the windows $W_1$ and $W_2$. In particular, the accumulations $N_1$ and $N_2$ are only incremented when the toggle 50 directs the output charge to the corresponding integration module. The counters can be incorporated into the control module 48. This is similar to a ΣΔ modulator where the feedback ensures the convergence of the accumulated signal from the two windows for a long measurement period, compared to the sample period (i.e. oversampled system). The control module 48 determines the product of the number of accumulations and the accumulated charge for each integration module. The control module terminates the process when these products are equal, namely when $N_1 \cdot Q_1 = N_2 \cdot Q_2$. At the end of the conversion the numbers stored in the counters can be used to determine the ratio of the charges according to Equation 2 below, where $T_P$ is the pulse width:

$$N_1 \cdot Q_1 = N_2 \cdot Q_2 \Rightarrow n = \frac{Q_1}{Q_2} = \frac{N_2}{N_1} \Rightarrow ToF = \frac{1}{2}\left(ToF_{max} + \frac{n-1}{n+1}T_p\right) \quad (2)$$

One advantage of this ΣΔ ToF measurement method compared to the previous Successive Approximation ToF measurement method is that the accumulated charge does not reset to zero over time which enables achieving better precision. Furthermore, the ΣΔ method does not require a high-frequency reference clock to shift the windows back and forth as is needed in the successive approximation method. The time quantization step is essentially equal to the width of the integration windows, but the quantization noise is kept limited by means of oversampling and noise shaping through ΣΔ modulation.

Figure 14:
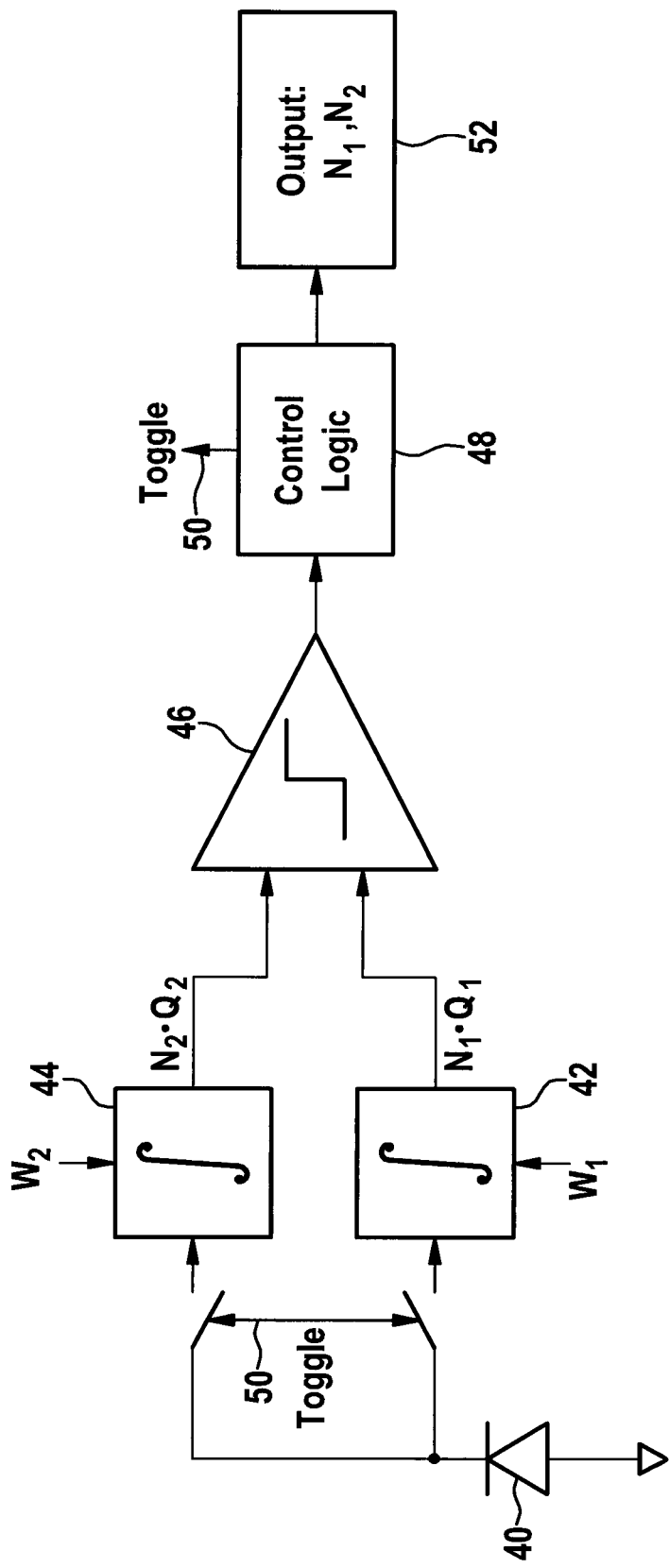
FIG. 14 is circuit diagram of a circuit for performing the sigma-delta modulation shown in the graph of FIG. 13, according to another aspect of the present disclosure.

One implementation of this ΣΔ time-of-flight (ΣΔ−ToF) engine is shown in the circuit diagram of FIG. 14. Like the circuit in FIG. 12 for the SA-ToF measurement, the circuit in FIG. 14 can be associated with each pixel/photodiode 40 or a group of pixels/photodiodes. The circuit includes two gated integration blocks 42, 44 that receive the charge from the photodetector 40 in response to reception of the RX signal. However, unlike the SA-ToF measurement circuit, a toggle 50 determines which integration block receives the signal from the photodetector to accumulate charge. Of course, in the initial step, the toggle 50 provides the RX signal to both blocks.

The outputs from the integration blocks $N_1 \cdot Q_1$ and $N_2 \cdot Q_2$ are provided to a comparator 46 with the result sent to a control module 48 that selects, via toggle 50, which of the integration blocks 42, 44 receives the charge from the photodetector 40 in the next step, depending on the comparison described above. The control module stores the output in a memory block 52. In this case, the output is the number of accumulations for the two windows, $N_1$, $N_2$, since according to Equation 2 above the ratio of these accumulations represents the ratio of measured ToF to the maximum measurable $ToF_{max}$ for the device. This ratio can thus be used to calculate the time-of-flight for the reflected Rx signal by multiplying the actual time value for $ToF_{max}$ by this ratio.

This calculation can occur in the control module 48 or in a separate processor receiving the output 52. The value for the actual time of flight can be provided as a sensible output, such as a visual display, or can be an output signal provided to a processing device, such as a Lidar, or an image or video processing device.

This circuit is similar to a conventional ΣΔ quantizer, except that the present circuit does not use a reference signal in its feedback digital-to-analog converter (DAC). Instead, the circuit uses the charges $Q_1$ and $Q_2$ as the two states that the DAC keeps toggling between. Therefore the precision of this technique does not depend on the precision of any analog parameter that should be generated on a CMOS chip, which is an important practical advantage.

One variant of this circuit can store charges from both windows on the same memory element (e.g. capacitor) but with opposite polarity. Then the decision for toggling the accumulation can be made by comparing the total stored charge to the initial reference state of the capacitor while the feedback loop ensures the overall accumulated charge at long time converges to zero ($N_1 \cdot Q_1 \cdot N_2 \cdot Q_2 = 0$).

Similar to a conventional ΣΔ modulator, the integrator (i.e. accumulation) in the feed-forward path can be replaced by a higher order transfer function to increase the order of the modulation and improve the precision at the cost of more sophisticated pixels that potentially occupy larger area on a chip. Considering modulation frequency at the range of tens of MHz (which is equivalent to a conventional ΣΔ sample rate) and a frame rate at the range of tens of Hz, the oversampling ratio is close to millions, which is large enough that does not require higher order loop filters for most of the 3D imaging applications.

It can be noted that when using the ΣΔ-ToF measurement system and method described herein, the background light can add to the charge from both windows and cause inaccuracy in the measurement. This issue can be mitigated by background light suppression techniques such as that proposed in M. Davidovic, G. Zach, K. Schneider-Hornstein and H Zimmermann, "ToF Range Finding Sensor in 90 nm CMOS Capable of Suppressing 180 klx Ambient light," in *IEEE Sensors*, 2010, the disclosure of which is incorporated herein by reference.

Figure 15:
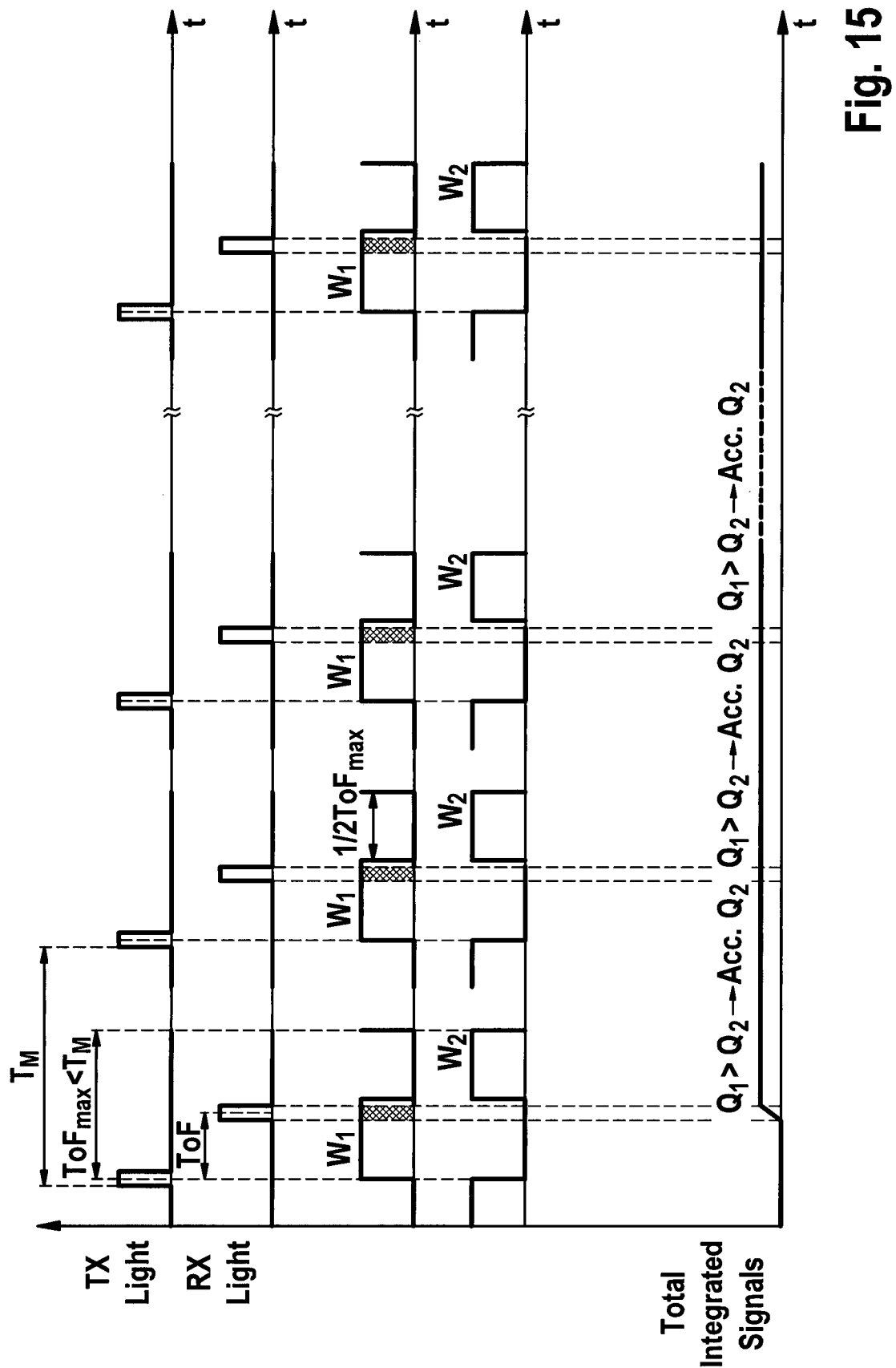
FIG. 15 is a graph of the sigma-delta modulation method using narrow modulation pulses.

The ΣΔ-ToF measurement method illustrated in FIG. 13, may not be accurate if the modulation waveform is a sharp pulse that falls under only one of the time windows $W_1$ or $W_2$, as illustrated in FIG. 15. Under this condition, the charge accumulated in each period is not a function of the pulse timing. In other words, a constant amount of charge is always accumulated in one of the windows, whether the pulse arrives in the beginning of that window or at the end of it. One way to extend the use of this method to such narrow pulse waveforms is to use a multi-bit ΣΔ modulator, where the width of the time quantization steps are short enough to ensure that the pulse-width will always have overlap at least with two of the steps, and hence, the charge accumulated within those steps will be an analog function of the pulse arrival time and the timing information won't be lost.

Another way is to use a two-step converter, in which the first step uses a low-resolution SA-ToF to locate the approximate ISP as described above in connection with FIG. 11. In the second step the exact ratio of the charge in the two windows is quantized using a ΣΔ core to resolve the timing of the arrival signal with higher resolution, as illustrated in FIG. 13. In this case the ΣΔ converter will not have the aforementioned limitation because the SA-ToF already ensures that the two ΣΔ quantization windows have proper timing so that the return pulse RX is not enclosed by a single window and its timing is correctly reflected by the ratio of the charges accumulated in the two windows.

The two step conversion technique described above could be used with SA-ToF followed by any other converter that could find the precise ratio of the charges $Q_1$ and $Q_2$ as done by the ΣΔ method. Furthermore, the secondary fine-conversion method does not have to be implemented in the pixel level and can be done in column, or frame-level as suited to the particular camera architecture and use-case. It can be appreciated that the circuitry shown in FIG. 14 in connection with the ΣΔ-ToF measurement method illustrated in FIG. 13 can be operated for the first step as the circuitry shown in FIG. 12 in connection with the SA-ToF method of FIG. 11. Thus, the control module 48 can be configured and operable to close the toggle 50 for both integration modules 42, 44 so that each module receives the charge output from the photodiode 40, thereby allowing the circuitry to operate in the SA-ToF mode. The control module operates in that mode for a limited number of steps, such as the first three steps shown in FIG. 11, to provide a low-resolution estimate of the location of the true ISP. At the completion of the low-resolution steps (i.e., three in the example) the control module 48 operates in the ΣΔ-ToF mode, as described above.

Finding the Integration Symmetry Point

In another feature of the present disclosure, a technique is provided for finding the integral symmetry point ISP of the RX waveform where the waveform is not a square wave. By way of background, a class of circuits known as a constant fractional discriminator (CFD) is often used to extract timing or phase information of a waveform independent of its amplitude and are useful in many different systems including Lidars. In a Lidar, the beams of light reflected from two objects with different reflectivity can have different amplitudes, which should not affect its timing. The measured distance to both objects should still be the same, even though the amplitude of the received signal might be different. An example of a prior art technique used to find the timing information of a waveform independent of its amplitude is disclosed in https://indico.cern.ch/event/522485/contributions/2145668/attachments/1284172/1909096/FEE2016.pdf, the entire disclosure of which is incorporated herein by reference. Many examples of prior art CFDs employ a time delay, td, which must be smaller than the rise time of the incoming pulse where the output of the CFD is a function of the pulse arrival time and the delay, as described in the previously-cited reference and in https://jrm.phys.ksu.edu/Resource/Pubs/CFD/CFD.html, the entire disclosure of which is incorporated herein by reference. Since the rise time can be on the order of 100's of picoseconds or less this delay must be quite small. In addition, this delay is often a function of environmental influences which vary such as temperature and power applied to the CFD. Hence while traditional CFD's provide timing outputs that are independent of signal amplitude their timing outputs are very sensitive to variation in the delay.

The methods disclosed herein for ToF measurement measure the timing of the waveform independent of its amplitude, which allows these methods to replace traditional CFD methods and circuits. One advantage of the method disclosed herein is that the technique is not based on a time delay. It only requires a fast integrator, which is often comprised of an amplifier and a capacitor, in which the fast integrator can be adaptively controlled with a feedback loop to find the ISP. Methods for an integration-based constant fraction discriminator (CFD) to determine the ISP are described with reference to FIGS. 16-20. Since the ISP point of a waveform is independent of its amplitude, the area underneath a pulse with arbitrary shape, such as the triangular waveform shown in FIG. 16, can be divided into two pieces—$A_1$ and $A_2$. The time stamps $t_1$, $t_2$ for the two areas $A_1$ and $A_2$ are equal and independent of the pulse height.

Figure 16:
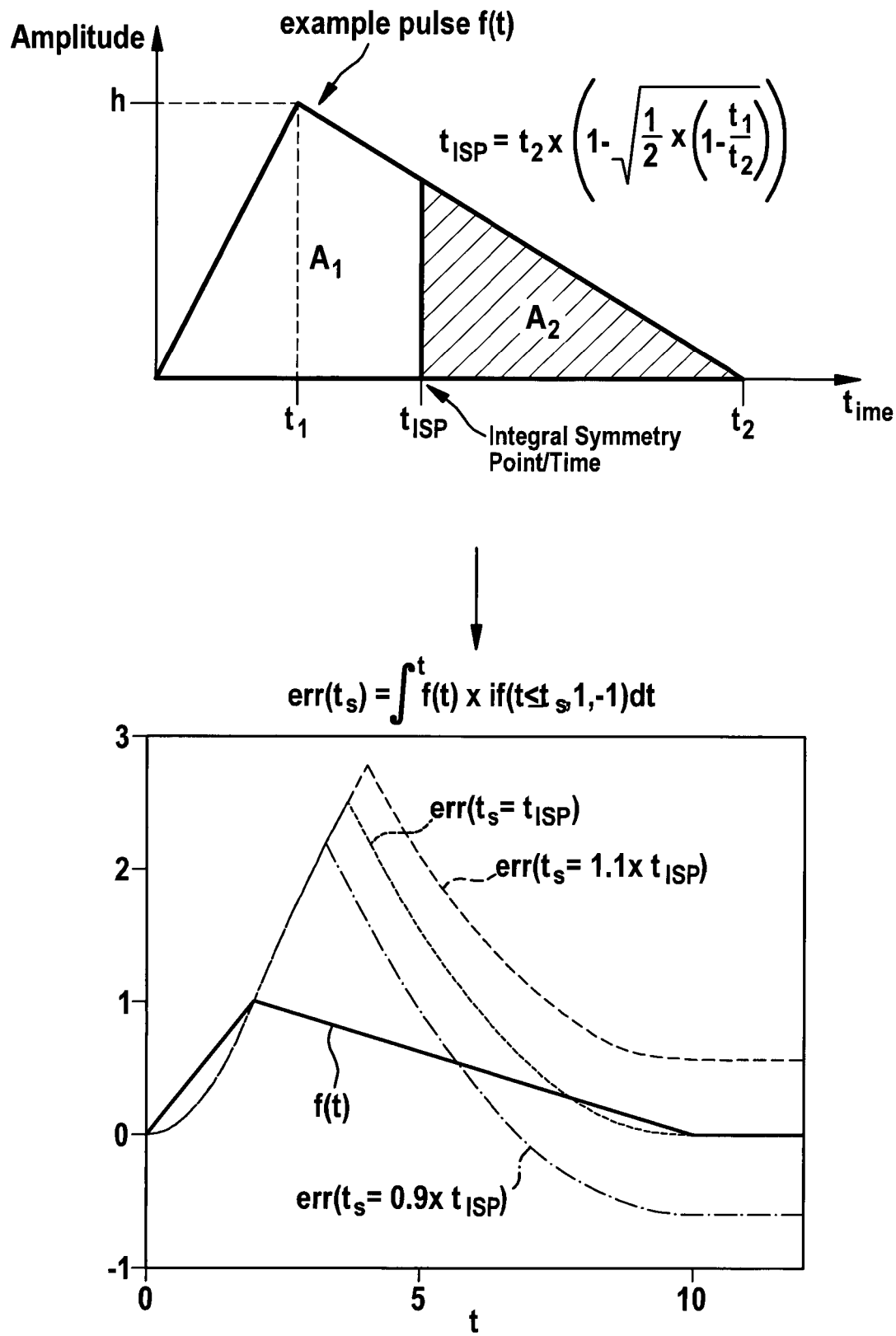
FIG. 16 is a chart explaining the operation of an integration-based constant fraction discriminator according to one feature of the present disclosure.
Figure 17:
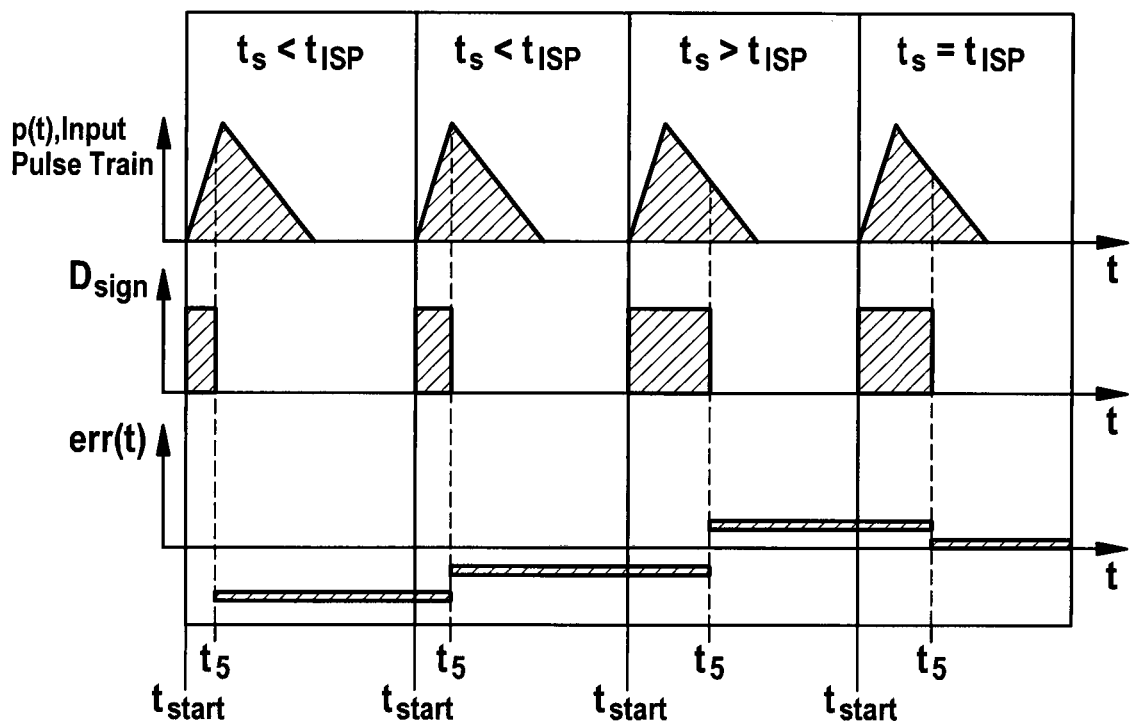
FIG. 17 is a diagram of a non-square wave transmitted signal illustrating a feedback loop for the integration based constant fraction discriminator to determine the integral symmetry point of the signal for use in the ToF measurements disclosed herein.
Figure 18:
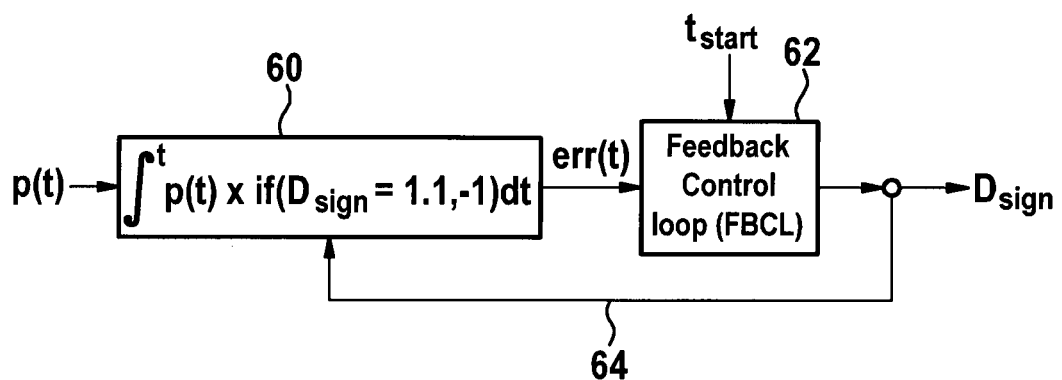
FIG. 18 is a diagram of a device for performing the feedback loop process shown in FIG. 17.
Figure 19:
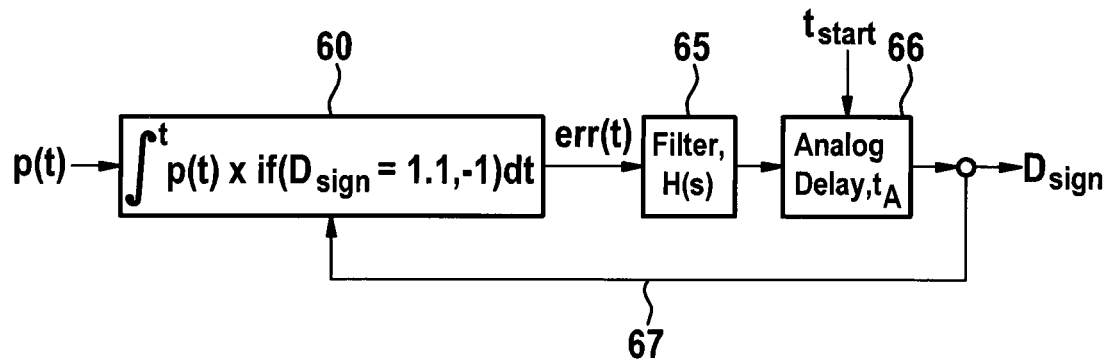
FIG. 19 is a diagram of a device for performing the feedback loop process shown in FIG. 17 incorporating an analog feedback loop.

FIGS. 17-18 illustrate how a feedback mechanism can be used to find the ISP point of the exemplary triangular pulse shape of FIG. 16, as repeated in FIG. 17. The pulse train signal p(t) (corresponding to the RX signal) under the first time window $A_1$ is supplied to an integration block 60 (FIG. 18) where the signal is integrated or accumulated with a positive sign ($D_{sign}=1$) until time $t_s$, while the area underneath the second time window $A_2$ is integrated in the integration block 60 with a negative sign ($D_{sign}=-1$) commencing at time $t_s$. The feedback control loop 62 moves the boundary, time $t_s$, between the two windows by adjusting the duration of $D_{sign}=1$, as reflected in the successive time intervals in FIG. 17, so that $D_{sign}$ is looped at 64 to the integration block to control the positive-negative sense of the integration. The feedback control loop 62 controls the duration of $D_{sign}$ and thus the increase in the duration of the window $A_1$ so that the positive integration continues until the error err(t) is no longer negative, at which time the feedback control loop 62 reduces the duration of the window $A_1$. The duration of window $A_1$ is continuously adjusted until the sum of the two integrated values err(t) is equal to zero, as reflected in the bottom line of the graph in FIG. 17. It can be noted that this system could be implemented in the digital or analog domain. The feedback signal 64 that controls the integration boundary (which could be analog or digital) can be used as a measure for the position of the ISP on the time axis. In the example of FIG. 17, the duration of the feedback signal $D_{sign}$ corresponds to $t_{ISP}$ and it is this value that be used to locate the ISP for the SA-ToF measurement (FIGS. 11-12) or for the ΣΔ-ToF measurement (FIGS. 13-14) when the TX and RX signal waveforms are not square waves. In the embodiment shown in FIG. 19, the feedback control loop can be replaced with a filter 65, which can be an integrator or other type of filter, and analog delay 66 providing the $D_{sign}$ to the feedback loop 67 to the integration block 60. The analog delay 66 receives a start signal $t_{start}$ (see FIG. 17) so that the time delay to is adjustable.

It can be appreciated that this ISP determination can be implemented by the control modules 18 or 48 at the commencement of their respective time-of-flight operations. Since the timing of both ToF measurement techniques commence at the ISP of the TX signal, the control modules 18, 48 can be configured ant operable to incorporate the integration and feedback of FIG. 18 or 19 to the TX signal to find the ISP.

Figure 20:
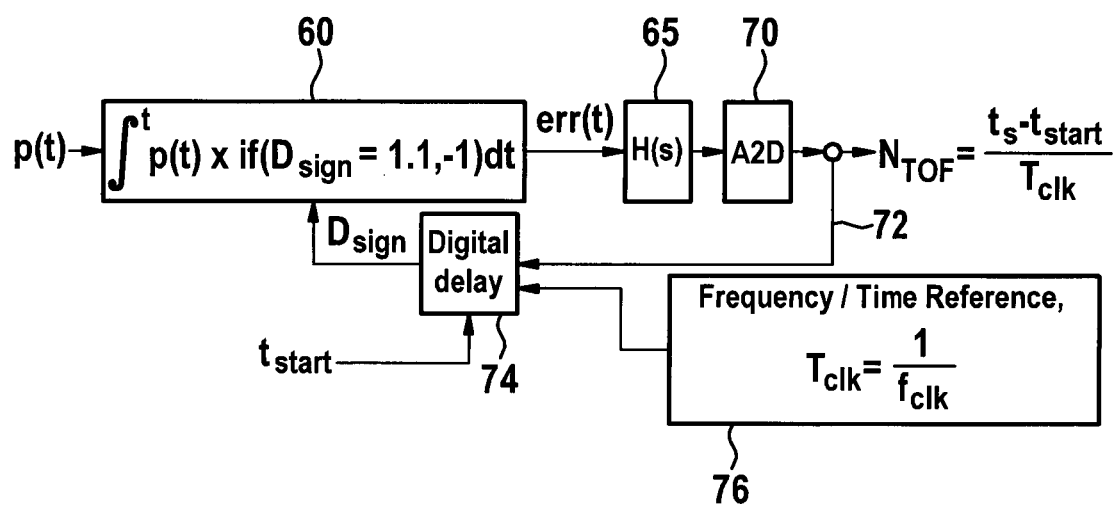
FIG. 20 is a diagram of a device for performing the feedback loop process shown in FIG. 17 for use with the ΣΔ time-of-flight measurement disclosed herein.

FIG. 20 illustrates a ΣΔ-ToF measurement method to find the ISP point. In this embodiment, the integration block 60 is followed by the filter 65 which filters the error signal err(t) generated by the integration block, as in the circuit of FIG. 19. However, the output of the filter is provided to an analog-to-digital converter which generates a total number of accumulations by the ΣΔ-ToF measurement method, and this value is used by a digital delay 74 to determine $D_{sign}$. The amount of the digital delay in the feedback path 72 indicates the position of the ISP point on the time axis. The digital delay 74 is controlled by a clock signal 76 and the start time $t_{start}$.

The present disclosure should be considered as illustrative and not restrictive in character. It is understood that only certain embodiments have been presented and that all changes, modifications and further applications that come within the spirit of the disclosure are desired to be protected.

What is claimed is:

1. A camera comprising:
   a light source for transmitting a pulsed light signal TX at an object;
   a detector array including at least one photodetector configured and arranged to receive a pulsed light signal RX reflected from the object, each photodetector configured to generate an output charge indicative of the detection of said light signal RX; and
   a pair of analog integration modules, each receiving the output charge of one or more photodiodes of the detector array, a first integration module configured to accumulate the output charge over the duration of a first time window and a second integration module configured to accumulate the output charge over the duration of a second time window trailing said first time window, a trailing edge of the first time window sharing a boundary with a leading edge of the second time window, each of said pair of integration modules configured to generate a corresponding first and second output integral value;
   a comparator for comparing said first and second output integral values and providing a comparator output; and
   a control processor operable in response to said comparator output to determine subsequent first and second time windows for a successive number of integrations by said first and second integration modules, said subsequent first and second time windows provided as inputs to the corresponding first and second integration module at each of said successive number of integrations;
   said control processor further configured and operable to terminate the successive number of integrations and to then generate an output corresponding to a ratio of a predetermined maximum time duration as a function of the first and second output integral values over said successive number of integrations; and
   a processor configured and operable to generate said ratio from said output of said control processor, to multiply said ratio by said predetermined maximum time duration to determine an actual time of flight value, and then providing a value corresponding to the actual time of flight value as an output.

2. The camera of claim 1, wherein said:
   said control processor is configured and operable to generate a binary bit having a binary "0" or "1" value based on the output of the comparator;
   a register receiving each binary bit from the control processor and storing an n-bit binary number, where n is the number of integrations performed by the pair of integration modules; and
   said processor is configured and operable to generate said ratio from the ratio of said n-bit binary number stored in said register to an n-bit binary number of n binary "1" values.

3. The camera of claim 2, wherein said control processor is operable to shift the timing of said subsequent first and second time windows in relation to transmission of said pulsed light signal TX at successive ones of said number of integrations.

4. The camera of claim 3, wherein said control processor is operable to shift the timing of said subsequent first and second time windows until the first and second output integral values are substantially equal.

5. The camera of claim 1, wherein the duration of each of the first and second time windows is equal.

6. The camera of claim 5, wherein the duration of each of the first and second time windows equals one-half said predetermined maximum time duration.

7. The camera of claim 1, wherein:
said pulsed light source is pulsed at a modulation time period; and
said predetermined maximum time duration is less than said modulation time period.

8. The camera of claim 1, wherein said predetermined maximum time duration is a maximum time of flight value detectable by the camera.

9. The camera of claim 1, wherein:
each of the pair of integration modules includes a capacitor for collecting the output charge and a transfer gate operable to provide the output charge to the capacitor only during a respective first time window and second time window; and
said control processor is configured and operable to control the transfer gate of each of said pair of integration modules to activate the respective transfer gate only during the respective first and second time window.

10. The camera of claim 1, wherein said control processor is operable to shift the timing of said subsequent first and second time windows in relation to transmission of said pulsed light signal TX at successive ones of said number of integrations.

11. The camera of claim 1, wherein:
said comparator output indicates which of said first and second output integral values is greater;
said control processor is configured and operable to prevent accumulation of charge in the one of said first and second integration modules having the greater output integral value and to permit accumulation of charge in the one of said first and second integration modules not having the greater output integral value for the next of said successive number of integrations;
said control processor including a first and second counter that is incremented each time said control processor permits accumulation of charge in the corresponding first and second integration module; and
said control processor further configured and operable to;
read the count in each of said first and second counters;
determine a value indicative of the accumulated charge in each of said first and second integration modules;
determine a first product of the count in said first counter and the accumulated charge in said first integration module;
determine a second product of the count in said second counter and the accumulated charge in said second integration module;
terminate the successive number of integrations when said first product is equal to or substantially equal to said second product; and
determine said ratio from the ratio of the count in said first counter and the count in said second counter.

12. The camera of claim 11, wherein said pair of analog integration modules include a toggle between said modules and said at least one photodetector, said toggle controlled by said control processor to connect the output of said at least one photodetector to a selected one of said analog integration modules to permit accumulation of output charge in said selected one and to prevent accumulation of output charge in the non-selected one of said integration modules.

13. The camera of claim 12, wherein:
each of the pair of integration modules includes a capacitor for collecting the output charge; and
said toggle includes a transfer gate associated with each of said pair of integration modules.

14. The camera of claim 1, wherein said first time window includes a leading edge and said control processor is configured to commence said first time window with said leading edge at the integral symmetry point (ISP) of each pulse of the pulsed light TX signal, wherein said integral symmetry point is the ISP time within the duration of each pulse in which the area under the pulse before the ISP time equals the area under the pulse after the ISP time.

15. A camera comprising:
a light source for transmitting a pulsed light signal TX at an object;
a photodetector array including at least one photodetector configured and arranged to receive a pulsed light signal RX reflected from the object, each photodetector configured to generate an output signal indicative of the detection of said light signal RX; and
a processor configured an operable to calculate the time-of-flight for the light signal TX to the object and reflected light signal RX to the photodetector array, the processor configured and operable to;
determine an integral symmetry point (ISP) of each pulse of transmitted light signal TX;
determine an ISP of each pulse of the received light signal RX over a predetermined number of pulses of the light signal RX by;
(a) at a first pulse of the signal TX, defining a first pair of time windows, each time window having a time duration equal to one half of the time duration of a predetermined maximum time-of-flight;
(b) aligning the leading edge of a first time window of the pair of time windows with the ISP of the pulse of the light signal TX and aligning the leading edge of a second time window of the pair of time windows with the trailing edge of the first time window;
(c) integrating the light signal RX within the first time window to produce a first integral value $Q_1$;
(d) integrating the light signal RX within the second time window to produce a second integral value $Q_2$;
(e) comparing the values $Q_1$, $Q_2$ and if $Q_1 > Q_2$, setting a first bit of a binary output number to a binary "0", and if $Q_2 > Q_1$ setting the first bit to a binary "1";
(f) at a second pulse of the signal TX, defining a first pair of windows as in steps (a) and (b);
(g) then defining a second pair of time windows, each time window having a time duration equal to one half of the time duration of a predetermined maximum time-of-flight;
(h) aligning the trailing edge of a third time window of the second pair of time windows and the leading edge of a fourth time window of the second pair of time windows with a midpoint of the window in step (e) having the greater integral value;
(i) integrating the light signal TX within the third time window to produce a first integral value $Q_3$;
(j) integrating the light signal TX within the fourth time window to produce a second integral value $Q_4$;
(k) comparing the values $Q_3$, $Q_4$ and if $Q_3 > Q_4$, setting a second bit of the binary output number to a binary "0", and if $Q_4 > Q_3$ setting the second bit to a binary "1";
(l) at a subsequent pulse of the signal TX, repeating steps (f)-(h);

(m) then defining a subsequent pair of time windows, each time window having a time duration equal to one half of the time duration of a predetermined maximum time-of-flight;

(n) aligning the trailing edge of a leading one of the subsequent pair of time windows and the leading edge of a trailing one of the subsequent pair of time windows of the second pair of time windows with a midpoint of the window determined at the immediately prior pulse of the light signal TX as having the greater integral value;

(o) integrating the light signal TX within the leading one of the subsequent pair of time windows to produce an integral value;

(p) integrating the light signal TX within the trailing one of the subsequent pair of time windows to produce an integral value;

(q) comparing the integral values and if the integral value of the leading one of the subsequent pair of time windows is greater than the integral value of the trailing one of the subsequent pair of windows, setting a subsequent bit of the binary output number to a binary "0", and otherwise setting the subsequent bit to a binary "1";

(r) repeating steps (l)-(q) for each of the remaining predetermined number of pulses of the light signal RX or up to the pulse of the light signal at which the integral values are equal between the windows of the subsequent pair of windows;

calculating the ratio of the binary output number to a binary number representing the time duration of the predetermined maximum time-of-flight, said binary number corresponding to a binary "1" in each bit corresponding to the number of bits in said binary output number;

multiplying the time duration of the predetermined maximum time-of-flight by the ratio to determine the time duration of the actual time-of-flight; and providing an output indicative of the time duration of the actual time-of-flight.

16. A camera comprising:

a light source for transmitting a pulsed light signal TX at an object;

a photodetector array including at least one photodetector configured and arranged to receive a pulsed light signal RX reflected from the object, each photodetector configured to generate an output signal indicative of the detection of said light signal RX; and a processor configured an operable to calculate the time-of-flight for the light signal TX to the object and reflected RX to the photodetector array, the processor configured and operable to;

determine an integral symmetry point (ISP) of each pulse of transmitted light signal TX;

determine an ISP of each pulse of the received light signal RX over a predetermined number of pulses of the light signal RX by;

(a) at a first pulse of the signal TX, defining a first pair of time windows, each time window having a time duration equal to one half of the time duration of a predetermined maximum time-of-flight;

(b) aligning the leading edge of a first time window of the pair of time windows with the ISP of the pulse of the light signal TX and aligning the leading edge of a second time window of the pair of time windows with the trailing edge of the first time window;

(c) integrating the light signal RX within the first time window to produce a first integral value $Q_1$;

(d) integrating the light signal RX within the second time window to produce a second integral value $Q_2$;

(e) determining a product $N_1 \cdot Q_1$ of the number of integrations within the first time window and the first integral value $Q_1$;

(f) determining a product $N_2 \cdot Q_2$ of the number of integrations within the second time window and the second integral value $Q_2$;

(g) determining the greater of the product $N_1 \cdot Q_1$ and $N_2 \cdot Q_2$;

(h) in the next integration, if the product $N_1 \cdot Q_1$ is greater integrating the light signal RX within only the first time window to increase the first integral value $Q_1$, or if the product $N_2 \cdot Q_2$ is greater integrating the light signal RX within only the second time window to increase the second integral value $Q_2$;

(i) repeating steps (e)-(h) until if the product $N_1 \cdot Q_1$ is equal to or substantially equal to the product $N_2 \cdot Q_2$;

determining the ratio of $N_1$ and $N_2$ as $N_1/N_2$;

multiplying the time duration of the predetermined maximum time-of-flight by the ratio to determine the time duration of the actual time-of-flight; and providing an output indicative of the time duration of the actual time-of-flight.

\* \* \* \* \*